(12) United States Patent
Jang et al.

(10) Patent No.: US 7,187,990 B2
(45) Date of Patent: Mar. 6, 2007

(54) PROCESS CONTROLLING METHOD WITH MERGED TWO-CONTROL LOOPS

(75) Inventors: Shi-Shang Jang, Hsinchu (TW); Po-Feng Tsai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 161 days.

(21) Appl. No.: 10/862,579

(22) Filed: Jun. 8, 2004

(65) Prior Publication Data
US 2005/0075993 A1  Apr. 7, 2005

(30) Foreign Application Priority Data
Oct. 6, 2003  (TW) .............................. 92127713 A

(51) Int. Cl.
*G05B 13/02* (2006.01)
*G06E 1/00* (2006.01)
(52) U.S. Cl. ......................................... 700/31; 706/15
(58) Field of Classification Search ............ 700/28–31, 700/37, 41–43, 47–48, 151, 152, 53, 67, 700/73–74; 706/29, 44, 15, 38
See application file for complete search history.

(56) References Cited

U.S. PATENT DOCUMENTS

| | | | | |
|---|---|---|---|---|
| 5,347,446 A | * | 9/1994 | Iino et al. ...................... | 700/29 |
| 5,477,444 A | * | 12/1995 | Bhat et al. ..................... | 700/48 |
| 5,519,605 A | * | 5/1996 | Cawlfield ...................... | 700/31 |
| 5,640,491 A | * | 6/1997 | Bhat et al. ..................... | 706/25 |
| 5,841,652 A | * | 11/1998 | Sanchez ........................ | 700/44 |
| 6,056,781 A | * | 5/2000 | Wassick et al. ................ | 703/12 |
| 6,493,596 B1 | * | 12/2002 | Martin et al. .................. | 700/37 |
| 6,625,501 B2 | * | 9/2003 | Martin et al. .................. | 700/44 |
| 6,718,234 B1 | * | 4/2004 | Demoro et al. ............. | 700/269 |
| 6,735,483 B2 | * | 5/2004 | Martin et al. .................. | 700/29 |
| 6,751,510 B1 | * | 6/2004 | Tan et al. ...................... | 700/41 |
| 6,819,964 B2 | * | 11/2004 | Harmse ....................... | 700/29 |
| 6,980,938 B2 | * | 12/2005 | Cutler ........................... | 703/2 |

OTHER PUBLICATIONS

Po-Feng Tsai, Ji-Zeng Chu, Shi-Shang Jang, Shyan-Shu Shieh, "Developing a robust model predictive control architecture through regional knowledge analysis of artificial neural networks", available 2002, Journal of Process Control 13, pp. 423-435.*
R.S. Parker and F.J. Doyle III, "Nonlinear Model Predictive Control of a Continuous Bioreactor at Near-optinum Conditions", Jun. 1998, Proceedings of the American Control Conference, pp. 2549-2553.*
Ji-Zheng Chu, Shi-Shang Jang and Yu-Nan Chen, "A Comparative Study of Combined Feedforward/Feedback Model Predictive Control for Nonlinear Systems", 2004, The Canadian Journal of Chemical Engineering.*

* cited by examiner

*Primary Examiner*—Thomas Pham
(74) *Attorney, Agent, or Firm*—Bacon & Thomas, PLLC

(57) ABSTRACT

The architecture of the controller of the present invention is mainly composed of three portions, which are a model predictive controller, a local controller (also called stably assistant controller), and a coordinator. This modified model predictive control structure merges two control loops by a coordinator. The control mode can be switched into either of them or provide a combined control action by adjustments of the coordinator. When the system moves out the range of the database, the coordinator will automatically detect the fault and switch to the stably assistant controller to provide the basic control quality to ensure the safety.

3 Claims, 24 Drawing Sheets

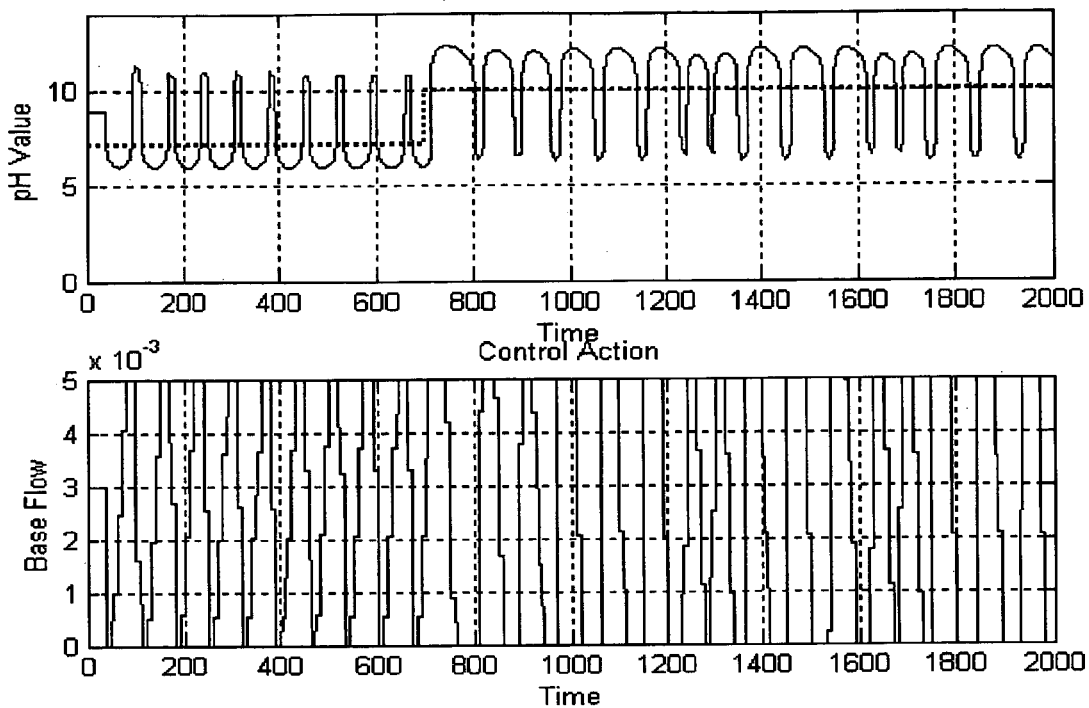
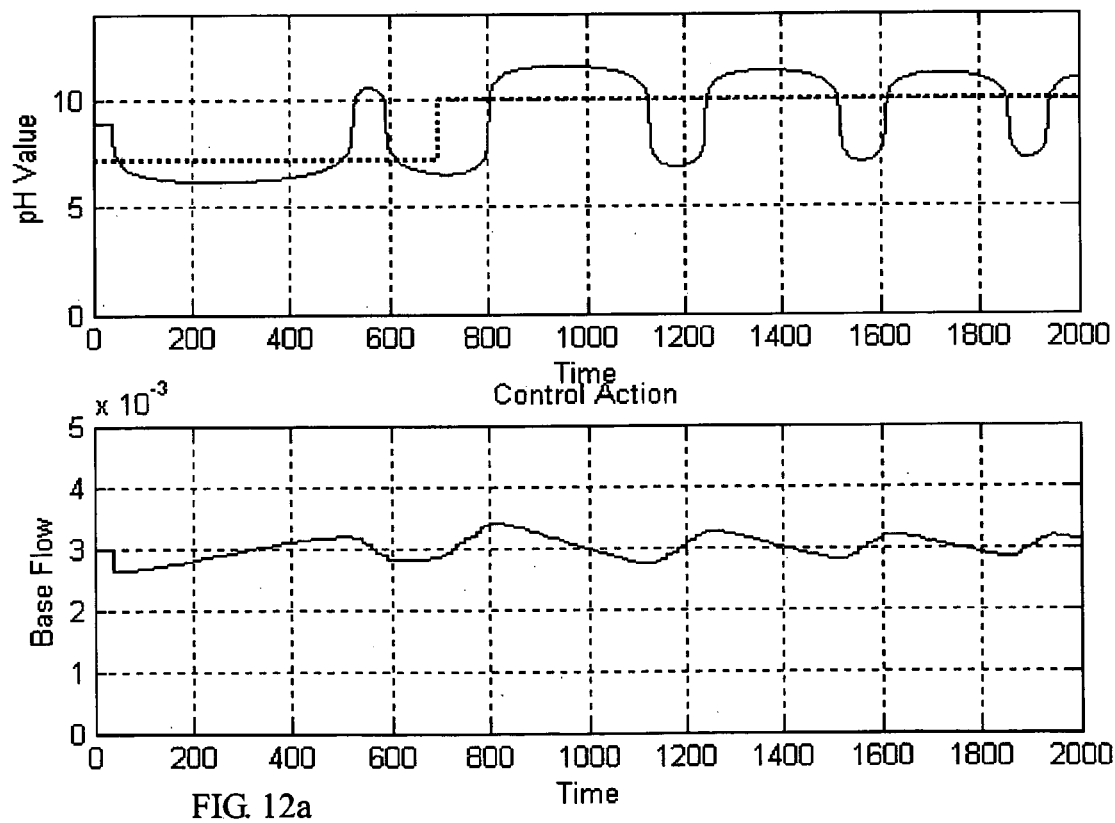

FIG. 13b  pH Control of CSTR

FIG. 14b  pH Control of CSTR

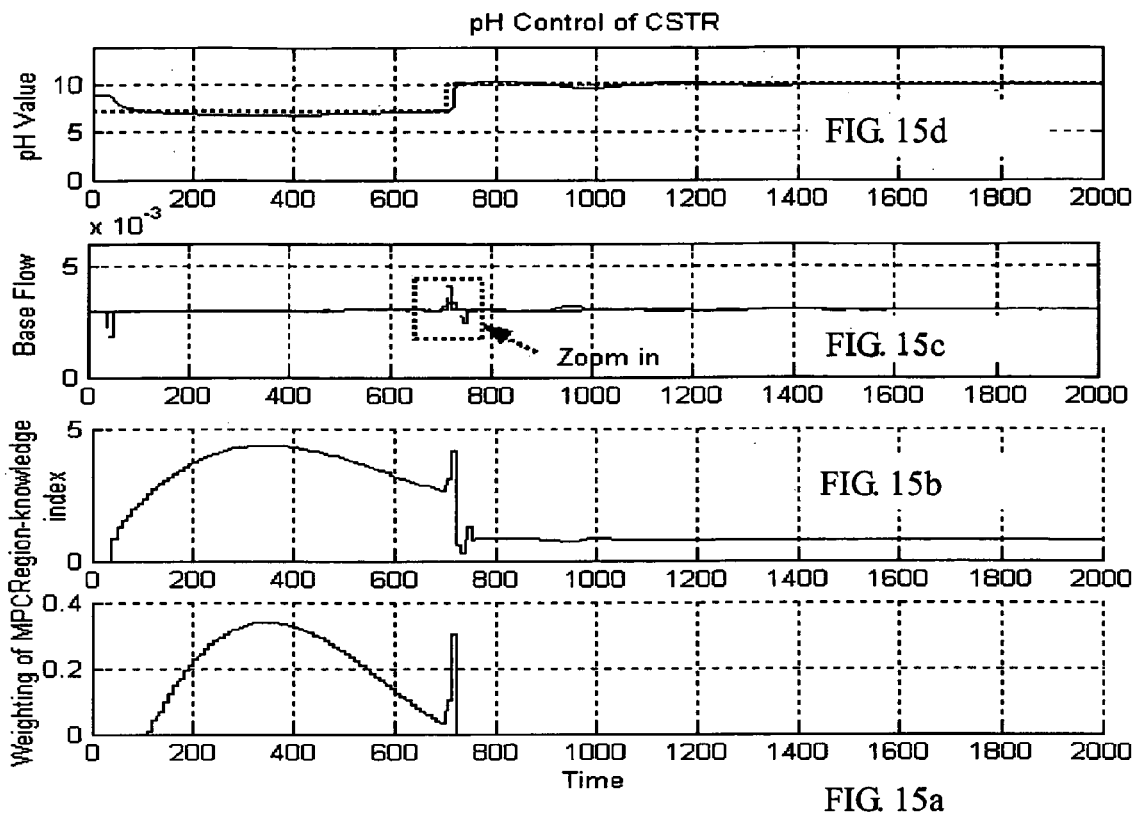
FIG. 15d
FIG. 15c
FIG. 15b
FIG. 15a
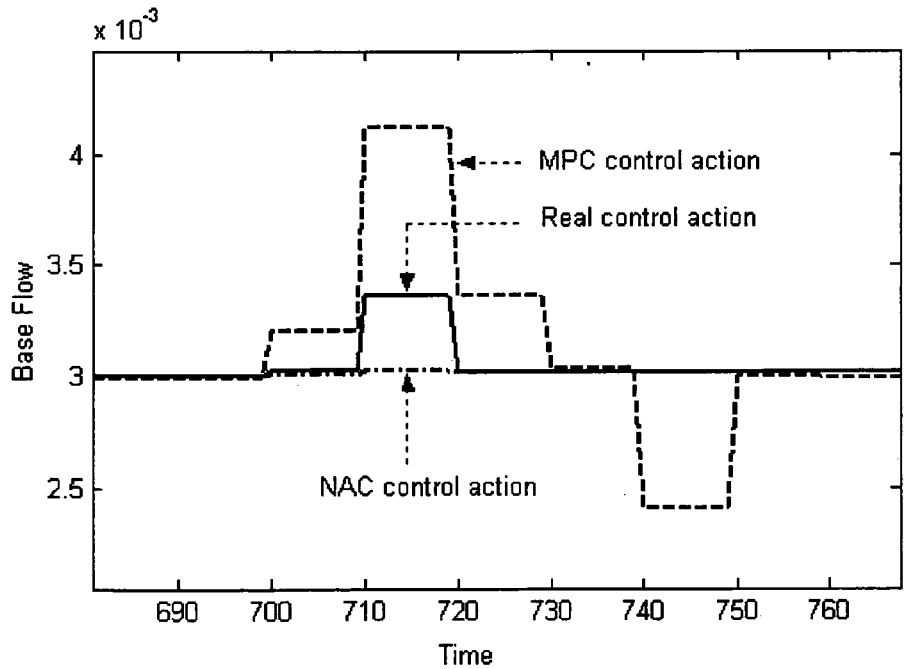
FIG. 16

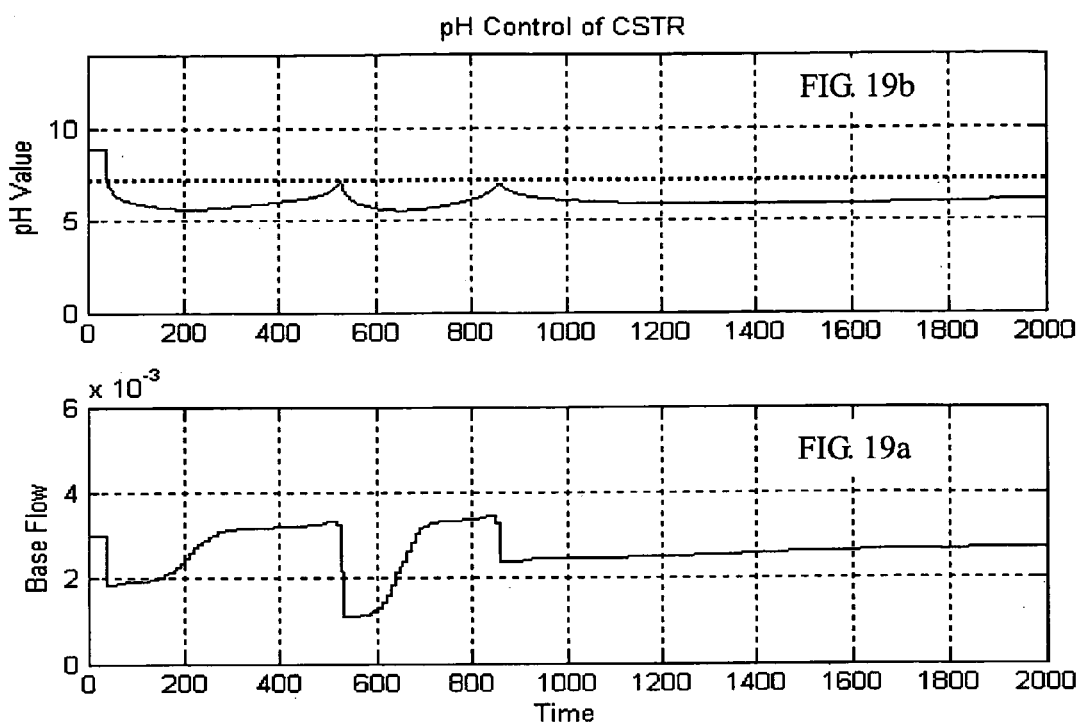
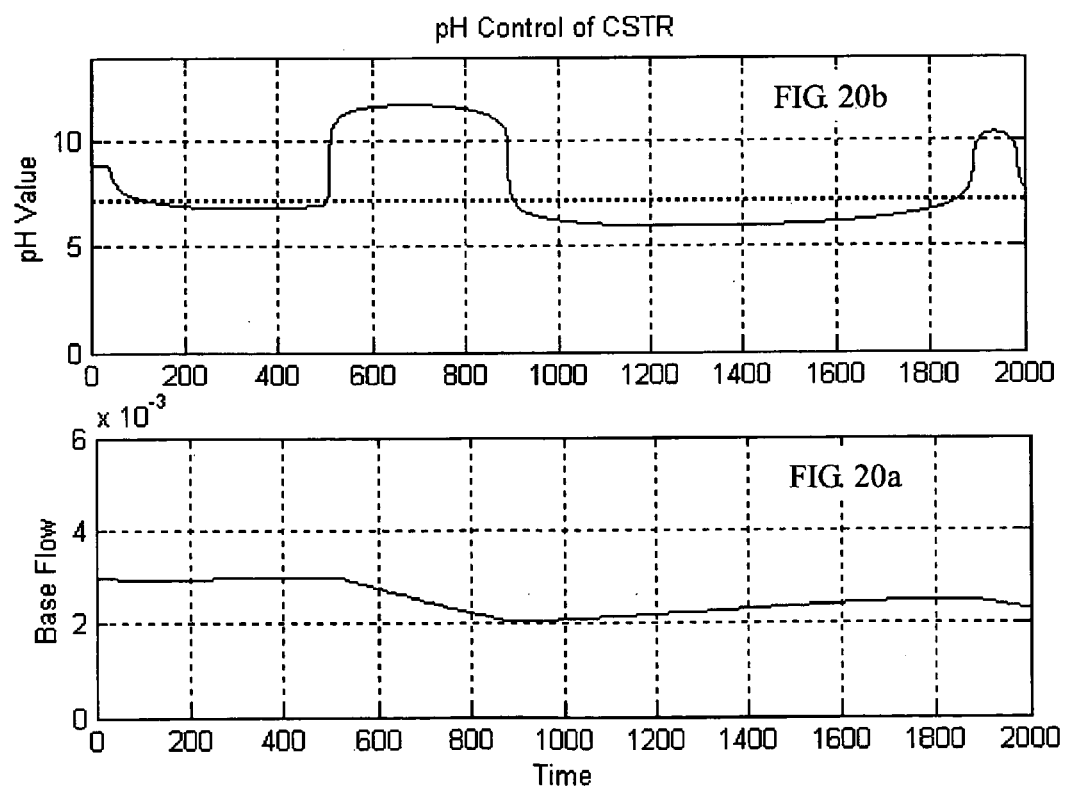

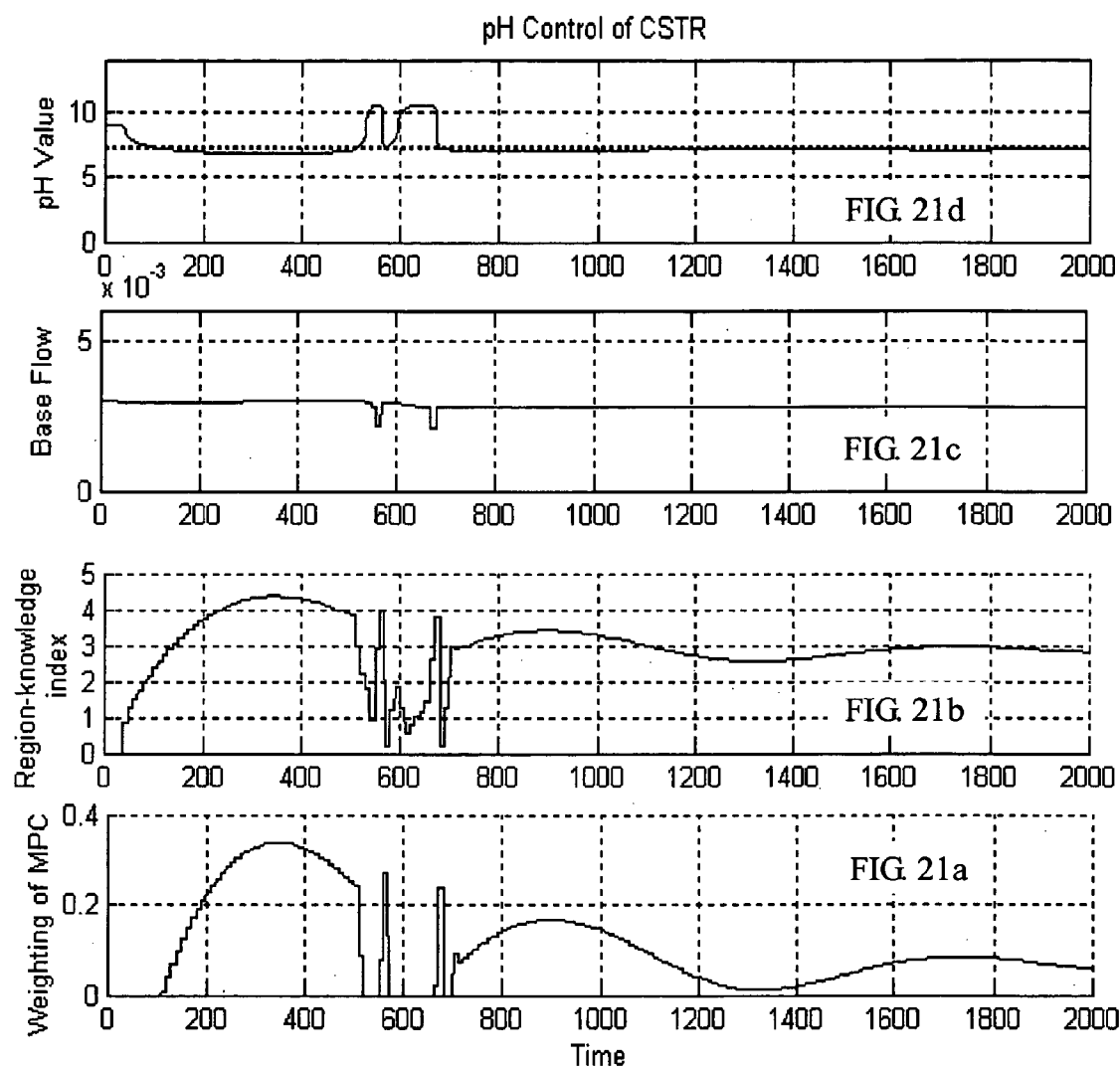

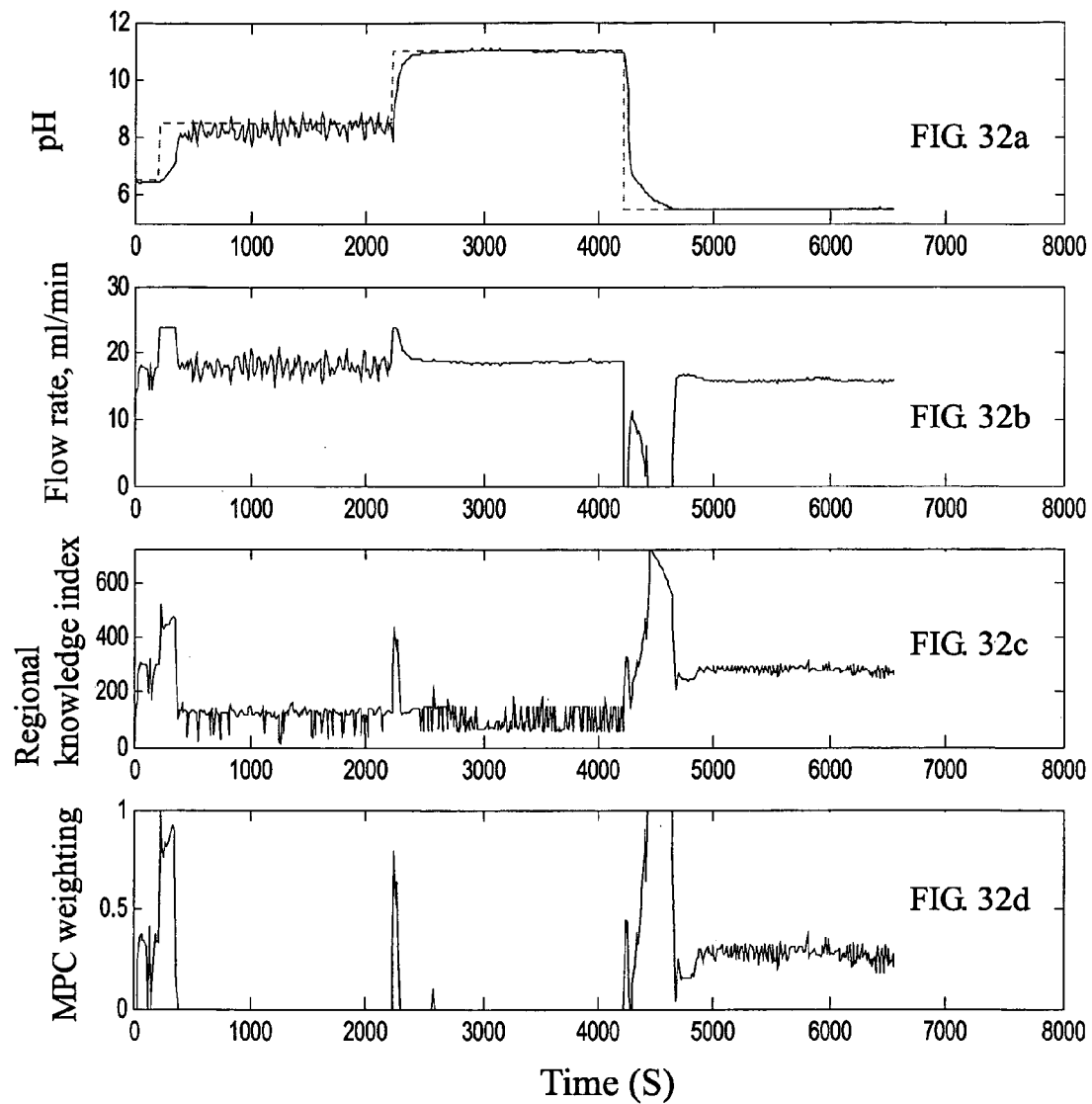

US 7,187,990 B2

PROCESS CONTROLLING METHOD WITH MERGED TWO-CONTROL LOOPS

FIELD OF THE INVENTION

The present invention is related to an improved process controlling method of a model predictive control, and in particular to a process controlling method with merged two-control loops of a model predictive controller and a stably assistant controller.

BACKGROUND OF THE INVENTION

Instigated by the great success of dynamic matrix control (DMC), the theory of model predictive control (MPC) has been receiving intensive attention in the process control area. The basic idea of MPC is to use a model to predict the future output trajectory of a process and compute a series of controller actions to minimize the difference between the predicted trajectory and a user-specified one, subject to constraints. It is clear that MPC demands a dynamic process model of proper accuracy and execution speed, though the feedback mechanism of MPC tolerates some model mismatch. Artificial neural networks (ANNs) as a process model for control purpose are recognized superior to other conventional modeling methods. Artificial neural networks provide a general approach for extracting process dynamics from input-output data only. Their learning ability makes them versatile and friendly for practical applications. With their great power for approximating complex functionality, their compact form and great speed of information retrieval make them highly suitable for online uses. Because of their empirical characteristics, ANN models need to be trained with a lot of operation data to cover certain operating ranges of process. Uncertainty of an ANN model often exists and may be severe for some special ranges. For instance, in a range around the equivalence point of neutralization where the process output (pH) is highly sensitive to the manipulated variable (flow rate of acid or base stream), training data is usually scarce, and an ANN model would be hence very rough.

SUMMARY OF THE INVENTION

A primary objective of the present invention is to provide an improved process controlling method of model predictive control to avoid the drawbacks of the conventional model predictive control.

The architecture of the controller of the present invention is mainly composed of three portions, which are a model predictive controller, a local controller (also called stably assistant controller), and a coordinator. This modified model predictive control structure merges two control loops by a coordinator. The control mode can be switched into either of them or provide a combined control action by adjustments of the coordinator. When the system moves out the range of the database, the coordinator will automatically detect the fault and switch to the stably assistant controller to provide the basic control quality to ensure the safety.

A process controlling method with merged two-control loops according to the present invention comprises the following steps:

i) inputting a value of $y_k$ of a controlled variable of a process at a sampling time point of k to a coordinator, so that the coordinator outputs a weighting, $\psi$, wherein $0 \leq \psi \leq 1$, and k is 0 or a positive integer;

ii) inputting said $y_k$ to a model predictive controller (MPC), so that a MPC output of a manipulated variable, $u_{MPC}$, is obtained from said MPC;

iii) inputting said $y_k$ to a stably assistant controller (SAC), so that a SAC output of said manipulated variable, $u_{SAC}$, is obtained from said SAC;

iv) calculating a combination output of said manipulated variable, u, according to the following formula:

$$u = \psi \cdot u_{MPC} + (1-\psi) \ast u_{SAC}$$

wherein $\psi$, $u_{MPC}$, and $u_{SAC}$ are defined as above; and v) adjusting said process by using said combination output; wherein in step i), $\psi$ is determined according to a calculation of a regional knowledge index function, said regional knowledge index function is established by evaluating performance of the MPC alone in controlling the process with test data so that said regional knowledge index function reflects whether the value of $y_k$ falls in a well trained region, an unfamiliar region or an intermediate region between these two regions, wherein $\psi=1$, when the value of $y_k$ falls in the well trained region; $\psi=0$, when the value of $y_k$ falls in the unfamiliar region; and $0<\psi<1$, when the value of $y_k$ falls in the intermediate region, wherein $\psi$ approaches 0, when the value of $y_k$ is getting closer to the unfamiliar region, and $\psi$ approaches 1, when the value of $y_k$ is getting closer to the well trained region;

in step v), said adjusting will cause a difference between a value of $y_{k+1}$ of the controlled variable at a sampling time point of k+1 and a set-point value, $y_d$, within a predetermined range, when $\psi=1$; and said adjusting will cause an absolute difference between a value of $y_{k+1}$ of the controlled variable at a sampling time point of k+1 and a set-point value, $y_d$, smaller an absolute difference between the $y_k$ and $y_d$, when $\psi=0$.

Preferably, said SAC is a PI controller, PID controller or neural adaptive controller.

Preferably, said MPC is an artificial neural network model controller.

BRIEF DESCRIPTION OF THE DRAWINGS

FIG. 7 shows plots of training data, wherein

FIG. 11 shows PI control tuned by ¼ decay method against a step change in set point, wherein FIG. 11a shows the relationship of the control action (basic solution flow rate) versus time, and FIG. 11b shows the relationship of the pH value output (solid line) and set-point (dot line) versus time.

FIG. 12 shows PI control tuned by the IMC algorithm ($\tau_{cl}$=500) against a step change in set point from pH=7 to 10, wherein FIG. 12a shows the relationship of the control action (basic solution flow rate) versus time, and FIG. 12b shows the relationship of the pH value output (solid line) and set-point (dot line) versus time.

FIG. 13 shows MPC against a step change in set point from pH=7 to 10, wherein FIG. 13b shows the relationship of the pH value output (solid line) and set-point (dot line) versus time.

FIG. 14 shows NAC against a step change in set point from pH=7 to 10, wherein FIG. 14b shows the relationship of the pH value output (solid line) and set-point (dot line) versus time.

FIG. 15 shows RMPC of the present invention against a step change in set point from pH=7 to 10, wherein FIG. 15a shows the relationship of the regional knowledge index versus time, FIG. 15b shows the MPC weighting versus time, FIG. 15c shows the relationship of the control action (basic solution flow rate) versus time, and FIG. 15d shows the relationship of the pH value output (solid line) and set-point (dot line) versus time.

FIG. 16 shows a zoom-in of the control actions shown in FIG. 15c.

FIG. 17 shows NAC against a sequence of step changes in set point, wherein

FIG. 18 shows RMPC of the present invention against a sequence of step changes in set point, wherein

FIG. 19 shows MPC against a disturbance in the acidic stream flow rate, wherein FIG. 19a shows the relationship of the control action (basic solution flow rate) versus time, and FIG. 19b shows the relationship of the pH value output (solid line) and set-point (dot line) versus time.

FIG. 20 shows NAC against a disturbance in the acidic stream flow rate, wherein FIG. 20a shows the relationship of the control action (basic solution flow rate) versus time, and FIG. 20b shows the relationship of the pH value output (solid line) and set-point (dot line) versus time.

FIG. 21 shows RMPC of the present invention against a disturbance in the acidic stream flow rate, wherein FIG. 21a shows the relationship of the regional knowledge index versus time, FIG. 21b shows the MPC weighting versus time, FIG. 21c shows the relationship of the control action (basic solution flow rate) versus time, and FIG. 21d shows the relationship of the pH value output (solid line) and set-point (dot line) versus time.

FIG. 24 shows the distribution of training data of an acid-base neutralization experiment using the equipment of FIG. 22, wherein

FIG. 29 shows the performance of a PI controller in conducting a pH value control using the equipment of FIG. 22, wherein

FIG. 30 shows the performance of a PI controller in conducting a pH value control using the equipment of FIG. 22, wherein

FIG. 31 shows the performance of a conventional model predictive controller in conducting a pH value control using the equipment of FIG. 22, wherein

FIG. 32 shows the performance of a robust model predictive controller of the present invention in conducting a pH value control using the equipment of FIG. 22, wherein FIG. 32a shows the relationship of the pH value output (solid line) and set-point (dot line) versus time, FIG. 32b shows the relationship of the control action (basic solution flow rate) versus time, FIG. 32c shows the relationship of the area knowledge index versus time, and FIG. 32d shows the MPC weighting versus time.

FIG. 34 shows the performance of a PI controller in eliminating disturbance during a pH value control experiment using the equipment of FIG. 22, wherein

FIG. 35 shows the performance of a conventional model predictive controller in eliminating disturbance during a pH value control experiment using the equipment of FIG. 22, wherein

FIG. 36 shows the performance of a robust model predictive controller of the present invention in eliminating disturbance during a pH value control experiment using the equipment of FIG. 22, wherein

DETAILED DESCRIPTION OF THE INVENTION

Figure 1:
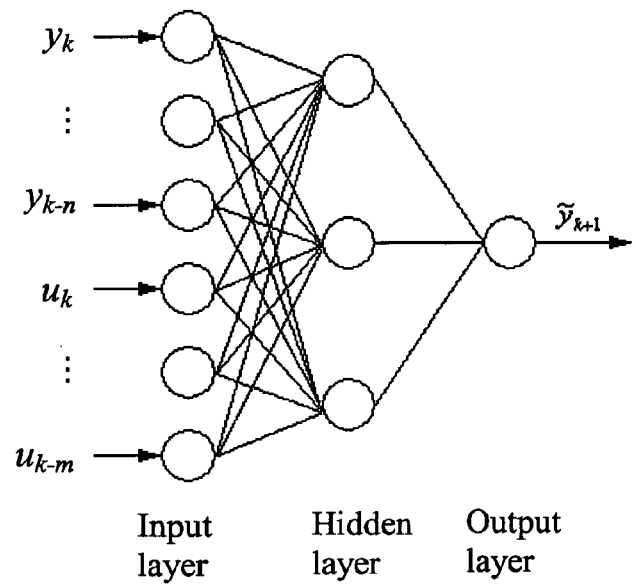
FIG. 1 shows a feed-forward neural network as the process model.

The present invention discloses a process controlling method based on a model predictive control for its fast response and characteristics of both feed-forward control and feedback control. The model performance is determined at every time step with the application of probability density function, which shows the relative operating regional knowledge as a guiding index to coordinate the model predictive controller (abbreviated hereinafter as MPC) and a local controller (also called stably assistant controller, abbreviated hereinafter as SAC). This is the main idea in designing a robust model predictive control (abbreviated herein after as RMPC) architecture proposed in the present invention. By weighting the two controllers, a vigorous or a clumsy control action can be avoided in the robust model predictive control architecture of the present invention. A regional knowledge analysis is proposed in the present invention, the weighting of MPC is decreased and the weighting of SAC is increased for the region of lack of training data, i.e. MPC model is not reliable in this region, so that the control actions of RMPC will not oscillate, and thus the process will be stably controlled. Therefore, a complicated approach for establishing the model of MPC and a special experiment design for solving the model prediction unreliable problem can be avoided, which is solved by directly proposing a control architecture having a coordinator in the present invention. The conventional PI controller or PID controller may be used as the stably assistant controller (SAC), the performance of which is enhanced after be integrated into the RMPC of the present invention. When the system moves out the range of the database, the coordinator will automatically detect the fault and switch to the SAC to provide system with the basic control quality of the PI controller or PID controller to ensure the safety.

Taking pH control system as an example, the first step we use a PI controller to carry out the pH control to obtain training data and test data for an artificial neural network (ANN) as a process model, wherein the basic solution flow rates (control action) and the pH value of the system verse sampling time are recorded after the set points of pH value are changed regularly.

The second step is setting up the numbers of the hidden layers and internal nodes of the ANN model architecture.

The third step is training and testing the ANN model. The second step and the third steps are repeated until a satisfactory ANN model architecture is established.

The fourth step is establishment of MPC by using the ANN model obtained from above.

The fifth step is adjusting the parameters of the SAC such as a PI controller or a neural adaptive controller (NAC) to meet the requirement of stable control.

The sixth step is finding the values of the regional knowledge index of ANN model having a steep decrease in the probability density function, which can be calculated by using the testing data set.

The seventh step is defining a lower limit and an upper limit of the regional knowledge index (a and b, respectively) by the values having steep decrease resulting from the sixth step.

The eighth step is setting an initial value of a smooth parameter of the coordinator, h, as 0.1, and connecting the MPC to SAC with the coordinator.

The ninth step is connecting the RMPC of the present invention to a process to be controlled, where the values of the controlled variable of the process are fed to the MPC and SAC simultaneously for parallel computation, and outputs of a manipulated variable from the MPC and SAC are fed to the coordinator simultaneously.

The tenth step is calculating a combination output of said manipulated variable in the coordinator and carrying out the control action by using the combination output.

The eleventh step is observing the control results and tuning h, the smooth parameter of the coordinator, based on appropriate technique such as IAE, which is usually 0.1–03. The setting of the RMPC of the present invention is then completed.

The following text is organized in five sections: the regional knowledge analysis of artificial neural network model; the proposed robust model predictive control architecture; testing results of the pattern analysis method and the new control architecture on a neutralization process; concluding remarks; and experiments on process pilot plant of acid-base neutralization control system.

1. Regional Knowledge Analysis of Artificial Neural Network Models

In this application, a feed-forward artificial neural network (FFN) model as depicted in FIG. 1, is implemented to control a neutralization process. Note that the following analysis is general and thus not limited to the case of FFN. For a single input and single output (SISO) dynamic system, any dynamic model, can be expressed in the following form:

$$\tilde{y}_{k+1} = f(y_k, y_{k-1}, \ldots, y_{k-n}, u_k, u_{k-1}, \ldots, u_{k-m}) \quad k=0, 1, 2, \quad (1)$$

where u and y are the input and the measured output, $\tilde{y}$ is the predicted output, k stands for the current time instant, and n and m are the output and input orders.

For convenience of statement, we define $$\omega = (y_k, y_{k-1}, \ldots, y_{k-n}, u_k, u_{k-1}, \ldots, u_{k-m}) \quad (2)$$

and $\omega$ is called an event in the dynamic space and is a general form of the input pattern to the artificial neural network model. Because $y_{k+1}$ is uniquely determined by the real process, we have the corresponding augmented event as follows:

$$\theta = (y_{k+1}, \omega) \quad (3)$$
$$= (y_{k+1}, y_k, y_{k-1}, \ldots, y_{k-n}, u_k, u_{k-1}, \ldots, u_{k-m})$$

Assume that the following training data set are used in building the above neural network model:

$$\Theta = \{\theta_i = (y_{k+1}^i, y_k^i, y_{k-1}^i, \ldots, y_{k-n}^i, u_k^i, u_{k-1}^i, \ldots, u_{k-m}^i) |_{i=1, \ldots, N}\} \quad (4)$$

And the corresponding set of input patterns is $$\Omega = \{\omega_i = (y_k^i, y_{k-1}^i, \ldots, y_{k-n}^i, u_k^i, u_{k-1}^i, \ldots, u_{k-m}^i) |_{i=1, \ldots, N}\} \quad (5)$$

Our problem is how to know whether an input pattern is included in the training data set or not. On the other hand, for a highly dimensional input event, we have to estimate how much the system knowledge we have around the neighborhood of the input event. If there are many training data points in this region, it means the event sits in a well-explored area and the model is suitable for predicting the outcome of the event. Otherwise, if the input event sits in an unfamiliar region, which has only few data points in it, the model prediction will very likely fail when it is highly nonlinear. This problem is meaningful because an artificial neural network model is usually assumed to be reliable only when interpolation among learnt patterns is performed. In deriving a criterion for the above judgment, the concept of Parzen-Rosenblatt probability density function [Haykin, S., *Neural Networks: A Comprehensive Foundation.* Prentice Hall International, Inc., $2^{nd}$ edition. (1999)] is used and extended as an index to measure the reliability of the model prediction.

The Parzen-Rosenblatt density estimate of a new event, $\omega_{new}$, based on the training data set, $\Omega$, is defined as:

$$f_\Omega(\omega_{new}) = \frac{1}{Nh^{m_0}} \sum_{i=1}^{N} K\left(\frac{\omega_{new} - \omega_i}{h}\right) \quad (6)$$

where the smoothing parameter, h, is a positive number called bandwidth or simply width, which controls the span size of the kernel function, $$K\left(\frac{\omega_{new} - \omega_i}{h}\right)$$

and $m_0$ is the dimensionality of the event set, $\Omega$. The kernel functions, K, are various and, however, both theoretical and practical considerations limit the choice. A well-known and widely used kernel is the multivariate Gaussian distribution:

$$K\left(\frac{\omega_{new} - \omega_i}{h}\right) = \frac{1}{(2\pi h^2)^{m_0/2}} \exp\left(\frac{\|\omega_{new} - \omega_i\|^2}{2h^2}\right) \quad (7)$$

Parzen-Rosenblatt probability density function is based on the distances between the new event, $\omega_{new}$, and the events, $\omega_i$, of training data set, $\Omega$, through the kernel functions. Once $\omega_{new}$ is close to some $\omega_i$, the relative kernel functions will give higher values and those $\omega_i$ which are not in the neighborhood will give lower values in the summation. The above probability density function (6) is denoted as regional knowledge index of each new event occurred to the process and every training data point is involved in calculating it. The kernel function plays a role just like a membership function of distance. In other words, if a region is crowded with data points, the "density" will be high, and it also implies that we probably have enough knowledge about this region. The role of regional knowledge index in the proposed coordinator will be thoroughly discussed in the following Section 2.3.

The above treatment on the reliability of empirical models, direct use of Parzen-Rosenblatt probability density over all the existing training data, provides a concise approach for control applications. Such a density is virtually the same as used by Leonard et al. [Leonard, J. A., M. A. Kramer and L. H. Ungar, A neural network architecture that computes its own reliability. *Computers & Chemical Engineering* 16 (1992) 819–835], except that they calculate the density of an event by weight-averaging the densities of the cluster centers obtained in training radial basis function networks (RBFN). As a matter of fact, the weight averaging approach will be reduced to the direct use of Parzen-Rosenblatt probability density if every point in the training set is taken as a center and the same activation function is used for each center, which is the idea of general regression neural network (GRNN). The density of any new event will locate among the values at the existing centers due to the interpolation [Leonard, J. A., M. A. Kramer and L. H. Ungar, A neural network architecture that computes its own reliability. *Computers & Chemical Engineering* 16 (1992) 819–835], which requires a careful decision on the number and distribution of the centers in order to guarantee a true representation of the centers to all the existing data points in the training set.

2. Architecture for Robust Model Predictive Control

Figure 2:
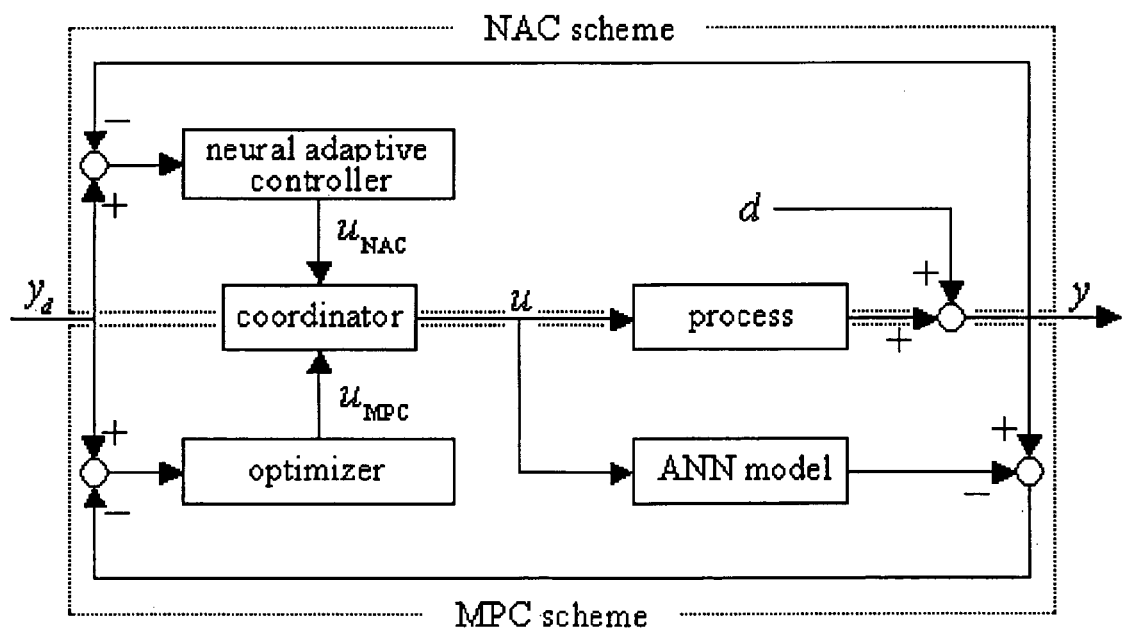
FIG. 2 shows architecture of the robust model predictive control (RMPC) of the present invention.

In the conventional model predictive control, serious uncertainty of the used model will endanger the stability of model predictive control. In such cases, additional or backup tuning measures are necessary, and the neural adaptive controller is suggested because its localized learning algorithm provides a model-free auto-tuning feedback mechanism. Based upon this analysis, a new architecture called robust model predictive control (RMPC) is proposed as a modification to the conventional MPC and is illustrated in FIG. 2. The proposed RMPC is composed of three parts: (1) a model predictive control scheme; (2) a neural adaptive controller (NAC) running in parallel with the MPC, and (3) a coordinator to decide the final control action according to the outputs of the parallel NAC and MPC and the fitness of the model used. In the following context, the three elements of RMPC are introduced.

2.1. Model Predictive Control

The proposed robust model predictive control shown in FIG. 2 is reduced to a standard model predictive control if we set $u = u_{MPC}$ in the coordinator. The optimizer performs the following constrained minimization problem:

$$\min_{u_{k+1}, u_{k+2}, \ldots, u_{k+P}} \sum_{j=1}^{P} \varphi_j (\tilde{y}_{k+j} - y_{d,k+j})^2 + \gamma_j \Delta u_{k+j}^2 \quad (9)$$

subject to $$u_{\min} \leq u_{k+j} \leq u_{\max} \quad j = 1, 2, \ldots, P \quad (10a)$$

$$|\Delta u_{k+j}| \leq \Delta u_{\max} \quad j = 1, 2, \ldots, P \quad (10b)$$

where $y_d$ is the set point value, P is the length of the prediction horizon, and $\phi$ and $\gamma$ are weights and are set to be unit in this invention. The optimal control sequence $\{u_{k+1}, u_{k+2}, \ldots, u_{k+P}\}$ can be found with a multivariate optimization procedure.

2.2. Neural Adaptive Control

Figure 3:
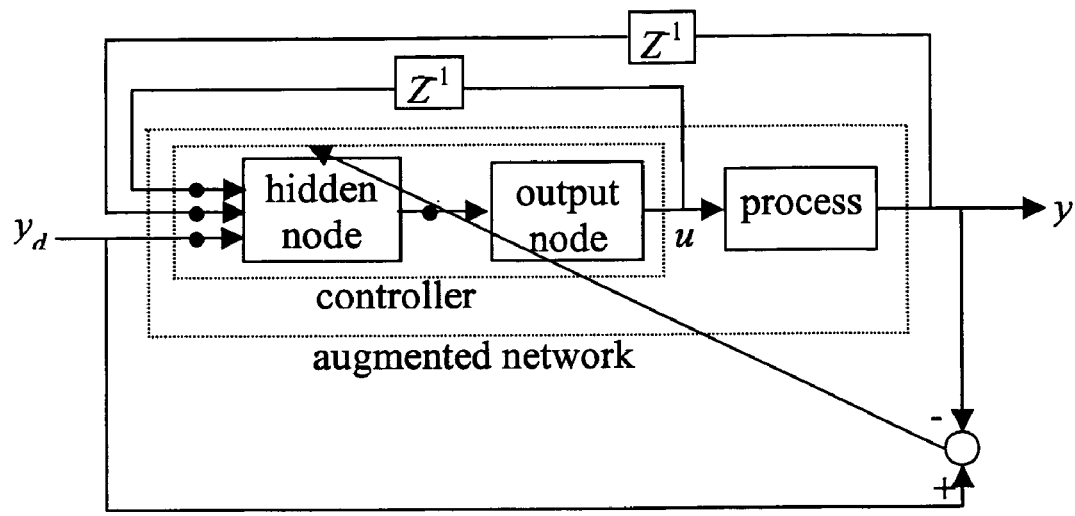
FIG. 3 shows a neural adaptive controller structure.

If we set $u = u_{NAC}$ in the coordinator, FIG. 2 is reduced to the neural adaptive control by Krishnapura and Jutan [Krishnapura, V. G., and A. Jutan, A neural adaptive controller. *Chemical Engineering Science* 55 (2000) 3803–3812] with a detailed structure shown in FIG. 3. The neural adaptive controller has three inputs, the set point $y_d$, the past value of the output y, and the control action u. There are two nonlinear nodes with sigmoid activation function in the hidden layer and the output layer, respectively, and four adjustable weights (black dots in FIG. 3) for the three inputs and the one output of the hidden node. Such a controller can be expressed as an augmented network by including the process as an unchangeable node.

The whole system works by updating all the four connecting weights in the network to minimize the deviation (E) of the process output from its set-point value at current time instant k:

$$E_k = \frac{1}{2}(y_{d,k} - y_k)^2 \tag{11}$$

This error signal is generated at the output of the plant and is passed backward to the neural network controller through the plant and is minimized with the steepest descent method according to the following equation:

$$W_{ij,k}^{(l)} = W_{ij,k-1}^{(l)} - \alpha \left(\frac{\partial E}{\partial W_{ij}^{(l)}}\right)_k \tag{12}$$

where $W_{ij}^{(l)}$ is the weight connecting node i in the upstream layer l and node j in the downstream layer l+1 (l=1, 2 and 3 for the input, hidden, and output layers respectively), and $\alpha$ is a constant denoting the learning rate of the network. The derivative can be formulated by applying the chain rule of differentiation:

$$\frac{\partial E}{\partial W_{ij}^{(l)}} = -(y_d - y) I_i^{(l)} \left(\frac{df_j^{(l+2)}}{dx}\right)\left(\frac{\partial y}{\partial u}\right) \sum_r W_{jr}^{(l+1)} \left(\frac{df_r^{(l+1)}}{dx}\right) \tag{13}$$

$$(l = 1, 2)$$

where $I_i^{(l)}$ is the input to node i in layer l, $$\left(\frac{df_i^{(l)}}{dx}\right)$$

is derivative of activation function of node i in layer l with respect to its only input x.

It is not easy to estimate the Jacobian of the process, $$\frac{\partial y}{\partial u}$$

in equation (13) at every sampling instant. Psaltis et al. [Psaltis, D., A. Sideris, and A. A. Yamamura, A multilayered neural network controller. *IEEE Control Systems Magazine* 8 (1988) 17–21] used an iterative approach to evaluate it. Krishnapura and Jutan [Krishnapura, V. G, and A. Jutan, A neural adaptive controller. *Chemical Engineering Science* 55 (2000) 3803–3812] proposed the use of a sigmoid function to approximate the process input-output gain information. Nguyen et al. [Nguyen, D. H. and B. Widrow, Neural networks for self-learning control systems. *International journal of control* 54(6) (1991) 1439–1451] constructed an ANN model for the same purpose. Yang et al. [Yang, Y. Y. and D. A. Linkens, Adaptive neural-network-based approach for the control of continuously stirred tank reactor. *IEE Proc.-Control Theory Appl.* 141(5) (1994) 341–349] proposed a so-called online adaptive neural-network-based controller (OANNC) to implicitly estimate the Jacobian values. As a matter of fact, $$\frac{\partial y}{\partial u}$$

can be thought of as a scaling factor, which decides the direction $$(\text{sign of } \frac{\partial y}{\partial u})$$

and magnitude $$\left(\left\|\frac{\partial y}{\partial u}\right\|\right)$$

of the gradient vector. In the training phase with steepest decent optimization, the error term $(y_d-y)$ in equation (13) is useful in speeding up the minimization process and in making a more flexible learning rate. The learning rate $\alpha$ is usually fixed and a small value of it is used to perform a fixed-step-size evolution whose direction is determined by the normalized gradient. Thus, magnitude part, $$\left\|\frac{\partial y}{\partial u}\right\|$$

of $$\frac{\partial y}{\partial u}$$

can be ignored, since $\alpha$ and $(y_d-y)$ are enough to determine the overall learning rate of the neural adaptive network. In this invention, we propose that $\alpha$ be tuned based on appropriate technique such as IAE.

2.3. Coordinator

In the proposed architecture as shown in FIG. 2, the model predictive controller and the neural adaptive controller run in parallel. A coordinator is designed to make the final decision based on the outputs of the above two controllers. Obviously, knowledge about the current state of the process and the accuracy of the ANN model used by the MPC is necessary to make a wise decision.

As a preliminary test, the following equation is used to combine the outputs of the MPC and the NAC:

$$u = \psi u_{mpc} + (1-\psi) u_{mac} \tag{14}$$

where $\psi$ is a decision factor with the following properties:

1. The decision factor $\psi$ is a positive number between 0 and 1.
2. $\psi$ is a model-reliability index that weights the control actions from model predictive controller and neural adaptive controller. If the model is built with perfect predicting precision, $\psi$ is taken to be 1, otherwise, it decreases with the precision.
3. The model predictive controller may have different performance in different operating area. So the value of decision factor is changing with the operating conditions.
4. The decision factor is thus determined by the regional knowledge index in equation (6). The higher values of regional knowledge index means the region around the input event is well explored and implying we have more knowledge about it so that higher $\psi$ is suggested. In the other words, $\psi$ is a function of region-knowledge index, $\hat{f}_\Omega(\omega_{new})$.

Figure 4:
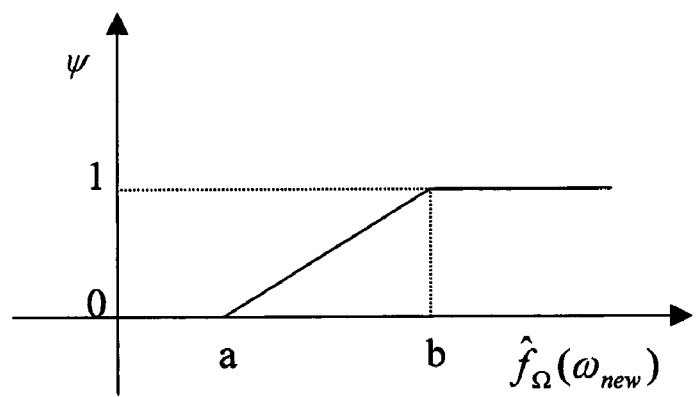
FIG. 4 shows a plot of $\psi$ vs. $f_\Omega(\omega_{new})$.

For simplicity, the following linear form denotes the decision factor $\psi$ is implemented in this work:

$$\psi = \Psi(\hat{f}_\Omega(\omega_{new})) = \frac{1}{b-a}\hat{f}_\Omega(\omega_{new}) - \frac{a}{b-a} \quad (15)$$

$$\text{for } a < \hat{f}_\Omega(\omega_{new}) \le b$$

where a and b are constants, and $\hat{f}_\Omega(\omega_{new}) \le a$, $\psi=0$ and $\hat{f}_\Omega(\omega_{new}) > b$, $\psi=1$ as shown in FIG. 4.

3. pH Control

In this part, the proportional-integral (PI) controller tuned by classical one-quarter decay method and by the internal model control (IMC) algorithm of Chien et al. [Chien, I. L. and P. S. Fruehauf, Consider IMC tuning to improve controller performance. Chem. Engng Progr. 86 (1990) 33–41], the conventional model predictive controller (MPC), the neural adaptive controller (NAC), and the proposed robust model predictive control (RMPC) are used in a simulated neutralization process, and comparison results are presented to show the great superiority of RMPC over all its counterparts.

3.1. pH Control System

Figure 5:
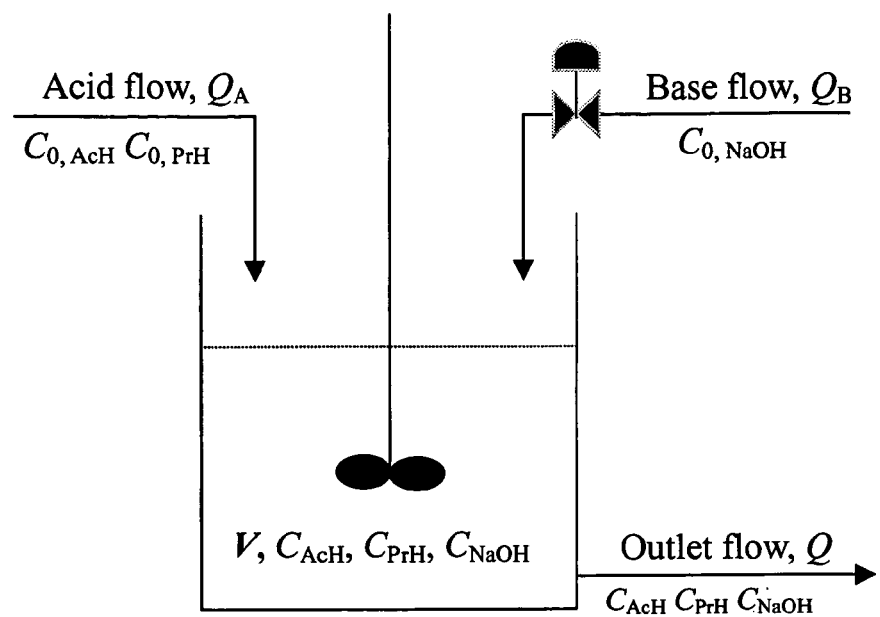
FIG. 5 shows a diagram of the simulated neutralization CSTR.
Figure 6:
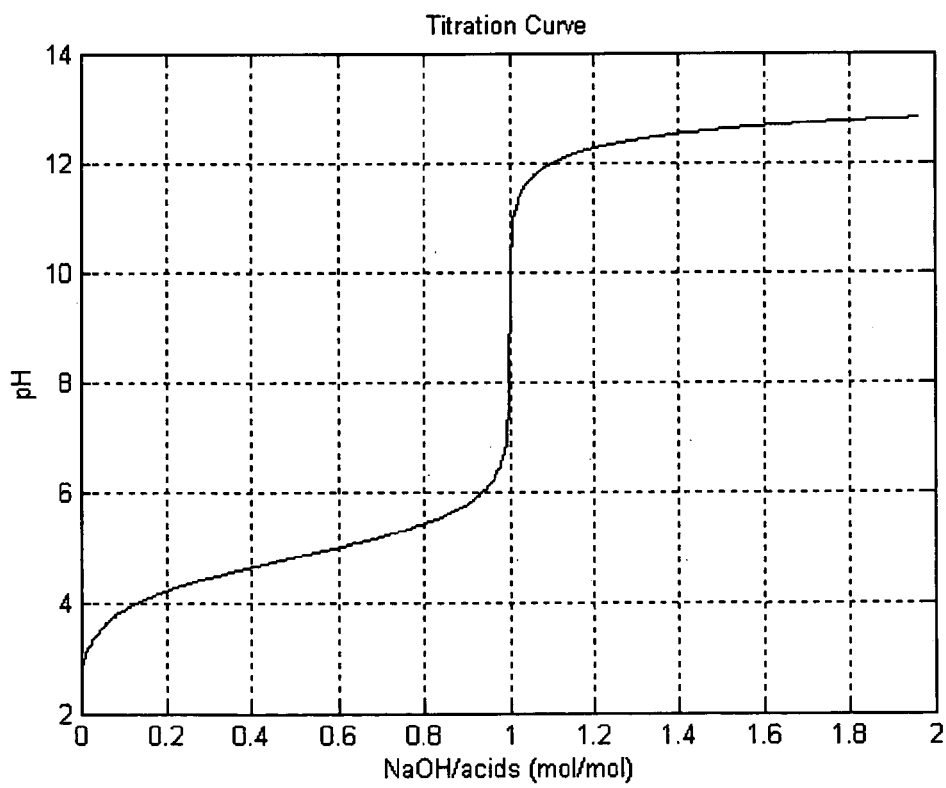
FIG. 6 shows a titration curve of pH simulation.

The simulated pH control system is adopted from Palancar [Palancar, M. C., J. M. Aragon, J. A. Miguens and J. S. Torrecilla, pH-control system based on artificial neural networks. *Ind. Eng. Chem. Res.*, 37 (1998) 2729–2740] and is shown in FIG. 5. There are two inlet streams to the continuous stirred tank of reaction (CSTR), the acid flow, $Q_A$, an aqueous solution of acetic acid and propionic acid, and the base flow, $Q_B$, an aqueous solution of sodium hydroxide. The outlet stream is Q. In this single input and single output system, the manipulated variable is the base stream flow rate and controlled variable is the pH value of the system. The titration curve for this system is shown in FIG. 6 which shows an equivalence point around pH=8.9.

The neutralization reactions are as follows:

$$AcH \Leftrightarrow Ac^- + H^+ \quad (17)$$

$$PrH \Leftrightarrow Pr^- + H^+ \quad (18)$$

$$NaOH \Leftrightarrow OH^- + Na^+ \quad (19)$$

$$H_2O \Leftrightarrow OH^- + H^+ \quad (20)$$

The reactions take place in the aqueous solution and the concentrations inside the CSTR are easily calculated by material balance equations. Those equations also provide the dynamic transient states of the system and they are:

$$Q_A C_{0PrH} = QC_{PrH} + V\frac{dC_{PrH}}{dt} \quad (21)$$

$$Q_A C_{0AcH} = QC_{AcH} + V\frac{dC_{AcH}}{dt} \quad (22)$$

$$Q_B C_{0NaOH} = QC_{NaOH} + V\frac{dC_{NaOH}}{dt} \quad (23)$$

where $C_{AcH}$, $C_{PrH}$ and $C_{NaOH}$ are concentrations of components AcH, PrH and NaOH, V is the volume of the reactor. The pH value is calculated with the compositions and the dissociation constants by the following formula:

$$\frac{C_{AcH}}{1+\frac{10^{-pH}}{K_{AcH}}} + \frac{C_{PrH}}{1+\frac{10^{-pH}}{K_{PrH}}} + 10^{(pH-14)} = C_{NaOH} + 10^{-pH} \quad (24)$$

$$pK_{AcH} = 4.75 \quad (25)$$

$$pK_{PrH} = 4.87 \quad (26)$$

$$pH = -\log_{10}[H^+] \quad (27)$$

The system's initial conditions are listed in Table 1.

TABLE 1

| Initial states of the pH control system | |
|---|---|
| pH | 8.9 |
| $C_{0,AcH}$ | 0.1 mol/l |
| $C_{0,PrH}$ | 0.1 mol/l |
| $C_{0,NaOH}$ | 0.2 mol/l |
| $Q_A$ | 0.003 l/s |
| $Q_B$ | 0.003 l/s |
| Q | 0.006 l/s |
| V | 1.75 l |

3.2. Data for Training the ANN Model

Figure 7B:
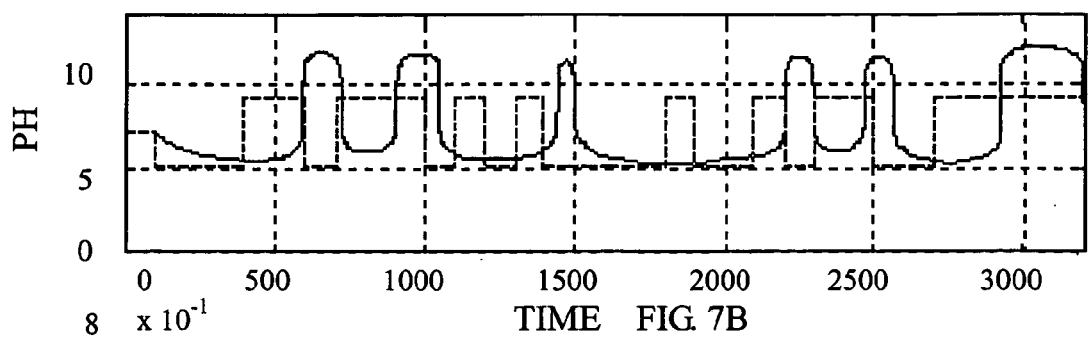
FIG. 7b shows the relationship of the control action (basic solution flow rate) versus time.
Figure 7A:
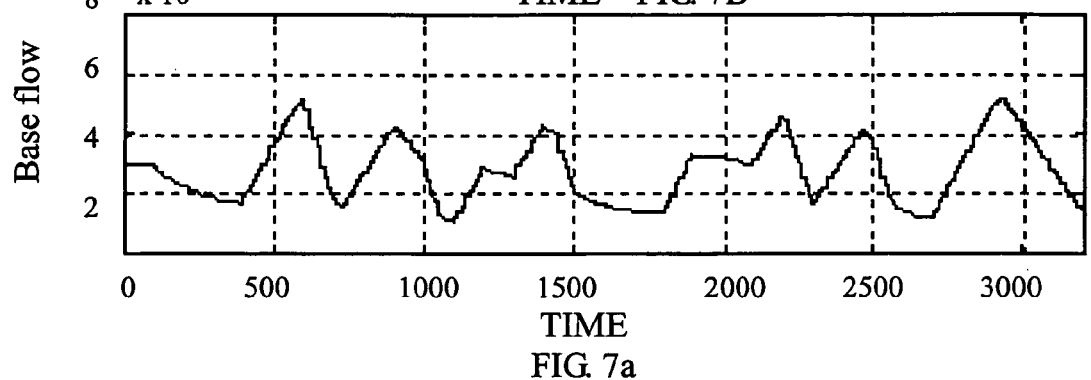
FIG. 7a shows the relationship of the pH value output (solid line) and set-point (dot line) versus time.

The data for training the ANN model used in the conventional MPC, and the proposed RMPC is generated by changing the set-point values to the PI controller, according to a five-cell pseudo-random binary sequence (PRBS). The PRBS includes $2^5-1=31$ signal patterns. The sampling and the control actions take place every 10 seconds. The training data thus obtained are shown in FIG. 7.

3.3. Artificial Neural Network Model

A three-layered feed-forward neural network with 6 inputs as shown in FIG. 1 is employed to build a model for MPC and RMPC. The inputs are the base flow rates and pH values at the current time instant, k, and the previous two time instants, k−1 and k−2. Since a simple structured ANN model may not be able to work well in the pH system as pointed out by Wang et al. [Wang, H., Y Oh and E. S. Yoon, Strategies for modeling and control of nonlinear chemical processes using neural networks. *Computers and Chemical Engineering* 22 (1998) S823–S826], eight nodes are used in the hidden layer to catch the strong non-linearity and the output is the predicted pH value at the next time instant, k+1.

Figure 8:
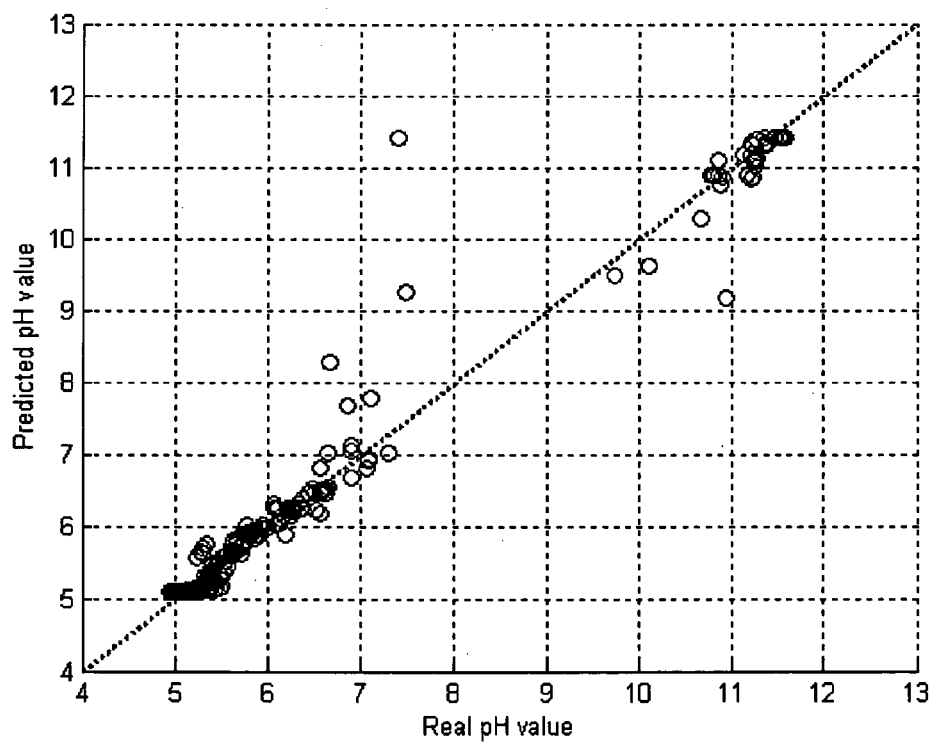
FIG. 8 shows raining result of the ANN model.
Figure 9:
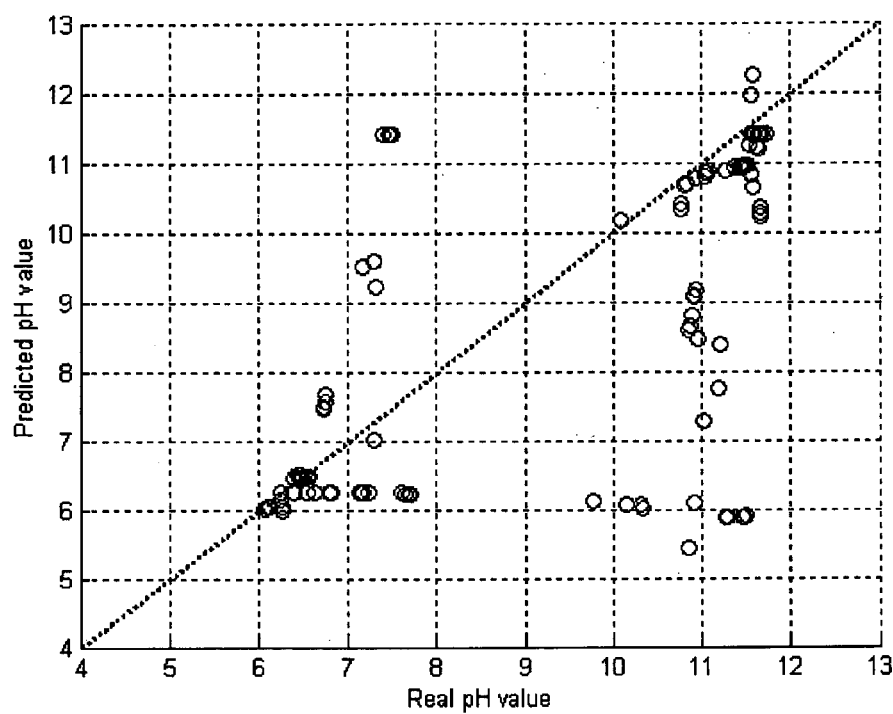
FIG. 9 shows testing result of the ANN model.

The training set consists of 320 data points while the testing set 150 data points. The training and testing results are illustrated in FIGS. 8 and 9. If we consider that the predicted points falling beyond the range of ±1 of real pH value are outliers, then 4 points out of 320 points are outliers in the training set while 40 out of 150 in the testing set. In other words, the outlier percentages for the training and testing set are 1.25% and 26.67% respectively. These two figures show that good agreement between the "experimental" data and the predicted ones of the ANN model for most data in the training set, but not so for the testing set. Most of these outliers take pH values near to the equivalence point of this neutralization system. The data points sitting in the region from pH 7 to pH 11 are very few and most data points crowd in the regions lower than pH 7 and higher than pH 11. The region close to the equivalence point is very poorly explored and the FFN model is also failed here.

3.4. Comparison of the Simulation Results

The neural adaptive controller used has three inputs: $Q_{B,k-1}$, $pH_k$ and $pH_{k-1}$ and is initiated by running it for some time at the steady state of the process. In tuning the PI controller by the one-quarter decay ratio response, the ultimate gain and period of the process are found to be $K_{cu} \cong 750$ and $T_u \cong 30$. The ANN model as stated above is used in the conventional MPC and the proposed RMPC. The prediction horizon for both MPC and RMPC is one time step ahead.

Figure 10:
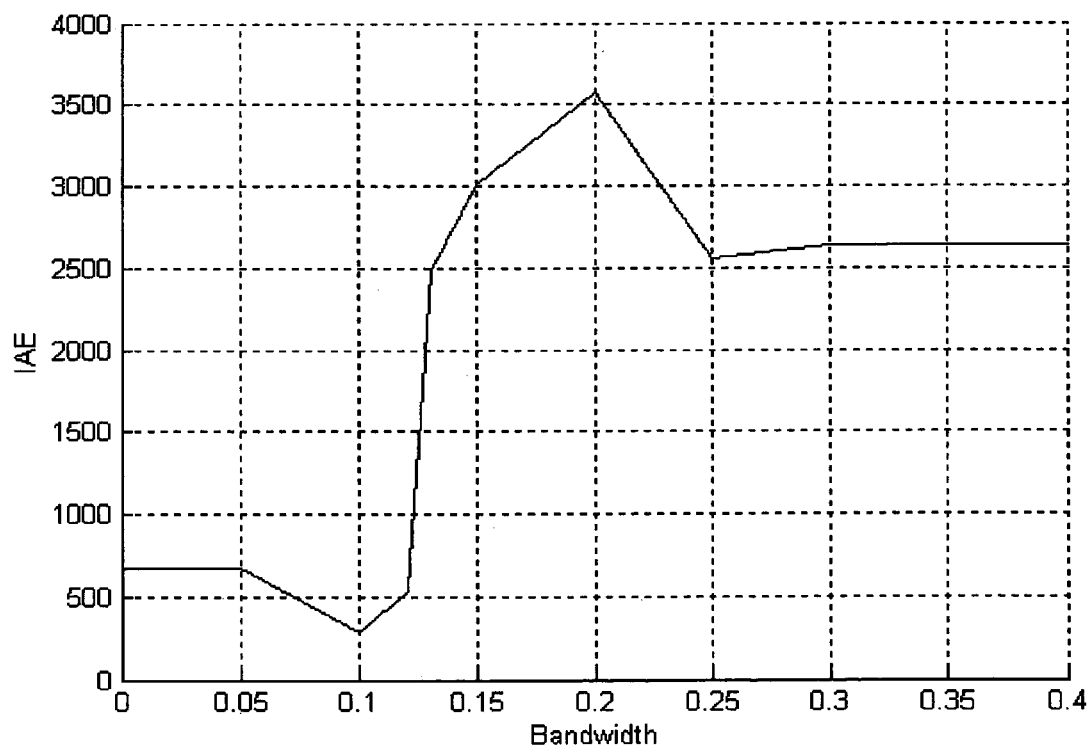
FIG. 10 shows results of the test for determining the bandwidth in equation (6).

The setup of RMPC include the bandwidth (h) in equation (6) and parameters a and b in equation (15). As pointed out by Leonard et al [Leonard, J. A., M. A. Kramer and L. H. Ungar, A neural network architecture that computes its own reliability. *Computers & Chemical Engineering* 16 (1992) 819–835], the bandwidth is crucial for the discussion of a "local" error measure for a model. If h is too small, the neighborhood considered to be local to the test point will not contain enough data to estimate the model accuracy and the test for extrapolation, namely lack of data, will be overly sensitive. If h is too large, the local variation in accuracy will be missed and the test for extrapolation will be insensitive. Specht [Specht, D. F., A general regression neural network. *IEEE Transaction on Neural Networks* 2 (1991) 568–576] has suggested that the bandwidth be selected between 0.1 to 0.3. For the studied pH control system, the bandwidth is set to be 0.1 according to a test result shown in FIG. 10. In the test, the IAE was recorded for a step change from pH 7 to 10 at each selected value of the bandwidth. It is clear from this figure that bigger bandwidth causes smoother and wider density distribution and that every point is taken as well known after bandwidth being greater than 0.3. Then the MPC dominates the control actions and the NAC stops working. However, for the bandwidth lower than 0.05, the NAC takes over the control priority. Therefore, the IAE will only change when the bandwidth value lies between 0.05 and 0.3. A minimum occurs at 0.1, which is thus used as our bandwidth. Three cases have been studied and the results are listed separately as following subsections. Parameters a and b in equation (15) can be easily determined by observing the sharp drops in RKI when extrapolation occurs, as will be seen in the regional knowledge index (RKI) plots in the following examples.

3.4.1. Case 1. Step Change in Set Point

Figure 13A:
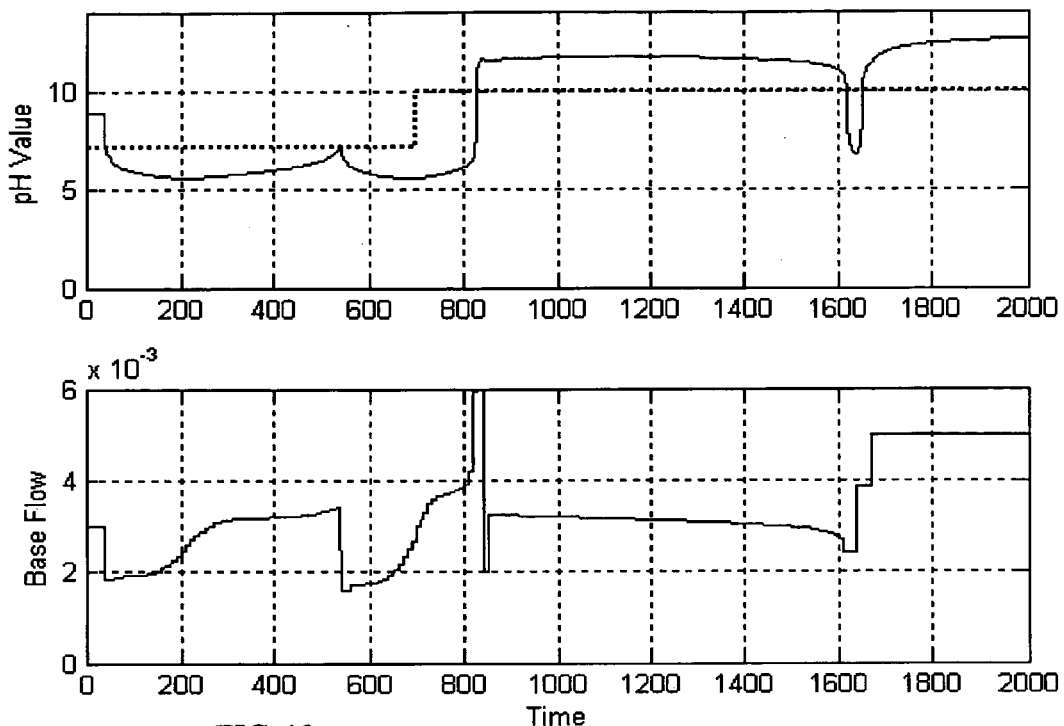
FIG. 13a shows the relationship of the control action (basic solution flow rate) versus time.
Figure 14A:
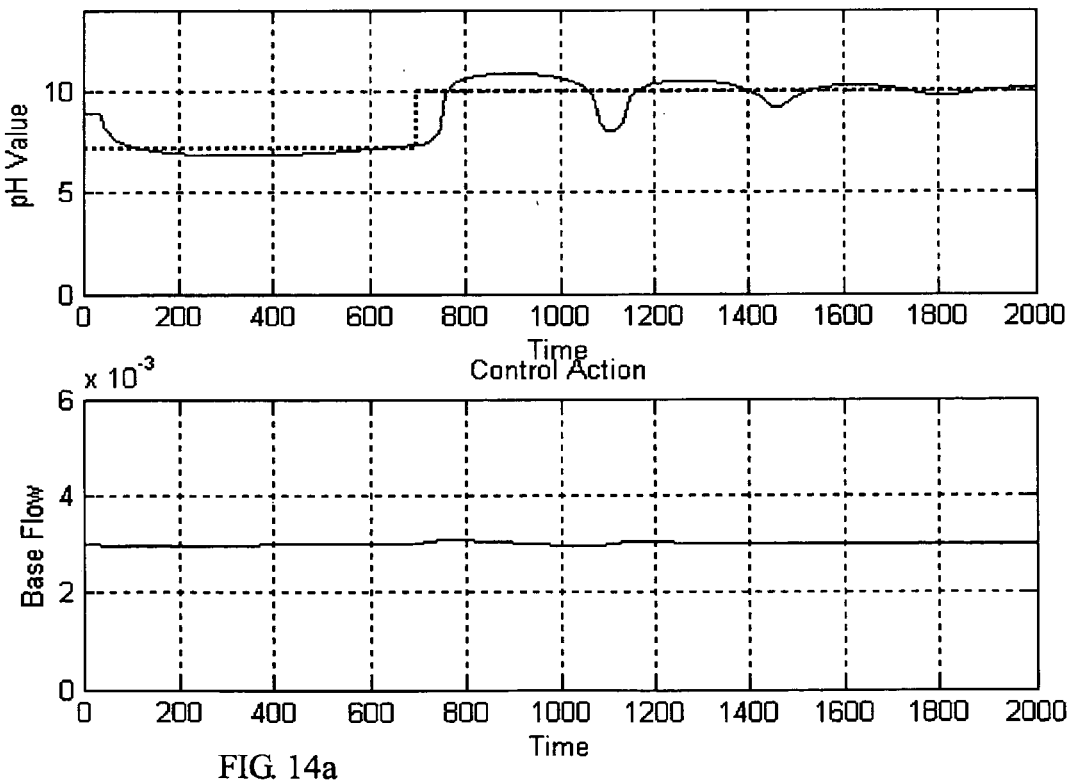
FIG. 14a shows the relationship of the control action (basic solution flow rate) versus time.

In this case, the above five control schemes are tested against a step change of the set point from pH=7 up to pH=10 at the $700^{th}$ seconds. The parallel running results are shown in FIGS. 11 to 15 for the five controllers. FIGS. 11 and 12 show that the PI controllers tuned by the one-quarter decay method and by the internal model control (IMC) algorithm ($\tau_{cl}$=500) do not work, though the IMC-tuned PI performs better at big $\tau_{cl}$ than the PI tuned by the one-quarter decay method. The MPC does not work either in this system as shown in FIG. 13. The neural adaptive controller works well if its learning rate parameter α is well tuned (α=0.1 for this particular example), as shown in FIG. 14, though long time is needed for it to compensate the error gradually in a feedback manner. The proposed RMPC behaves excellently as illustrated in FIG. 15.

It should be noted that as shown in FIG. 15, the regional knowledge index, the probability density function decreases abruptly around the equivalence point. This is due to few experimental data around this point as shown in FIGS. 8 and 9. The decrease of the regional knowledge index implies that the system is moving to a poorly known region where the model is unreliable and the weighting for MPC is reduced by the coordinator. In order to show how the coordinator works, we zoom in the area around the $700^{th}$ second where the set point changes from pH 7 to pH 10 in FIG. 16. The MPC suggests a much more aggressive control action than NAC does and the coordinator combines them according to the regional knowledge index, which leads to a mild control action between them.

3.4.2. Case 2. A Sequence of Step Changes in Set Point

Figure 17B:
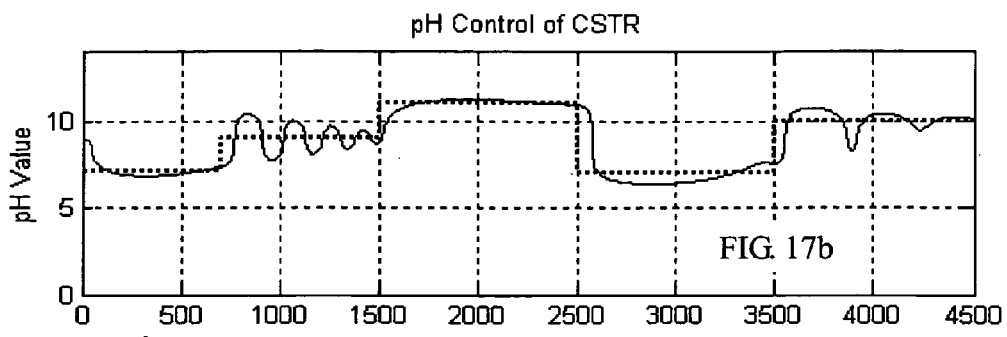
FIG. 17b shows the relationship of the pH value output (solid line) and set-point (dot line) versus time.
Figure 17A:
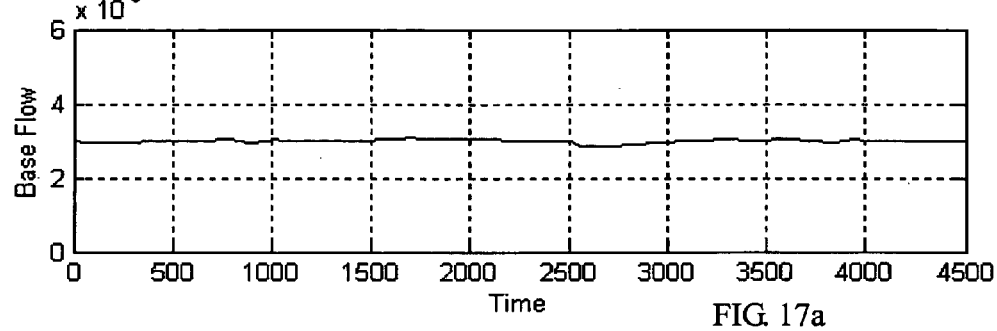
FIG. 17a shows the relationship of the control action (basic solution flow rate) versus time.
Figure 18D:
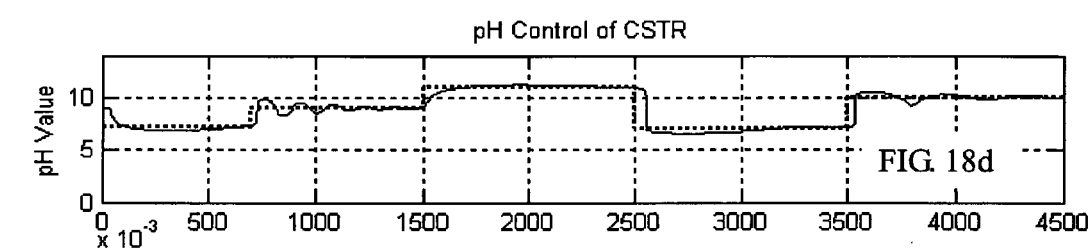
FIG. 18d shows the relationship of the pH value output (solid line) and set-point (dot line) versus time.
Figure 18C:
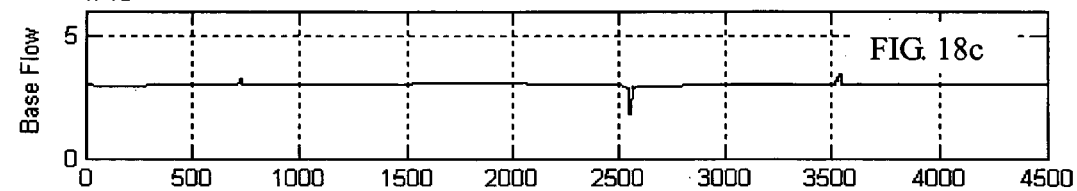
FIG. 18c shows the relationship of the control action (basic solution flow rate) versus time.
Figure 18B:
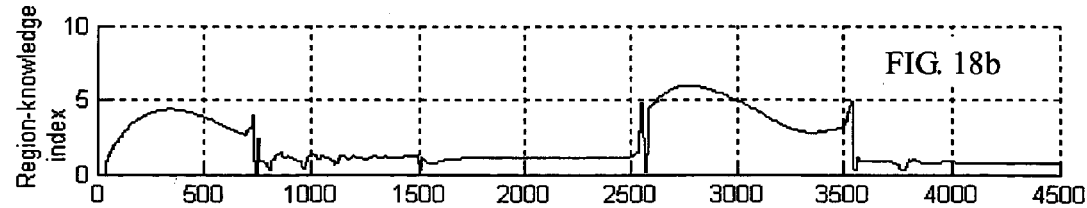
FIG. 18b shows the MPC weighting versus time.
Figure 18A:
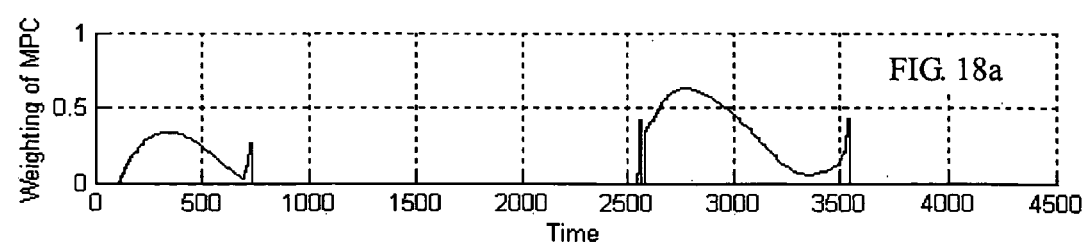
FIG. 18a shows the relationship of the regional knowledge index versus time.

The surviving two controllers in case 1, namely NAC and the proposed RMPC are further tested against a sequence of step changes in set point, and the results are depicted in FIGS. 17 and 18. As expected, NAC deteriorates rapidly when facing successive fast changes of large magnitudes, because its feedback mechanism needs long enough time to bring the system to a steady state. Contrary, RMPC works well even at the sharp equivalence point of neutralization.

3.4.3. Case 3. Disturbance in the Acidic Stream Flow Rate

In order to evaluate the disturbance-proof capability of the proposed RMPC, it is tested against a 20% reduction in the unmeasured acidic stream flow rate at the $500^{th}$ second. Parallel tests are carried out for NAC and the conventional MPC. The testing results are shown in FIGS. 19 to 21.

FIG. 19 shows that MPC results in an oscillatory system. FIG. 20 tells us that NAC can resist the disturbance after a long time of regulation. The excellence of RMPC is clearly revealed in FIG. 21 where fast and stable control performance is observed.

4. Conclusion

Artificial neural network model predictive control has been an active and important research topic because model predictive control provides a promising and general architecture to treat complex control problems and artificial neural networks are a general approach for industrial modeling. However, the incompleteness and inaccuracy of artificial neural network models generally exist and deteriorate the performance of the above control scheme. For highly nonlinear and/or sensitive processes, the deterioration is so bad that stable control is impossible. In solving this problem, regional knowledge analysis is proposed in this invention and applied to analyze artificial neural network models in process control. New input patterns, which mean extrapolation and, thus unreliable prediction by an artificial neural network, can be recognized from steep decrease in the probability density function, which can be calculated from the training data set. In case that the predictive control is unable to achieve stable and smooth control, the conventional model predictive control is modified by incorporating a parallel-running neural adaptive controller to provide sufficient stability. A coordinator regulates the weights of the outputs from the model predictive controller and the neural adaptive controller to make the final control decision. The regional knowledge index in the coordinator determines the weights by considering the present state of the controlled processes and the model fitness to the present input pattern. The proposed analysis method and the modified model predictive control architecture are applied to a neutralization process. Excellent control performance is observed in this highly nonlinear and sensitive system.

Figure 22:
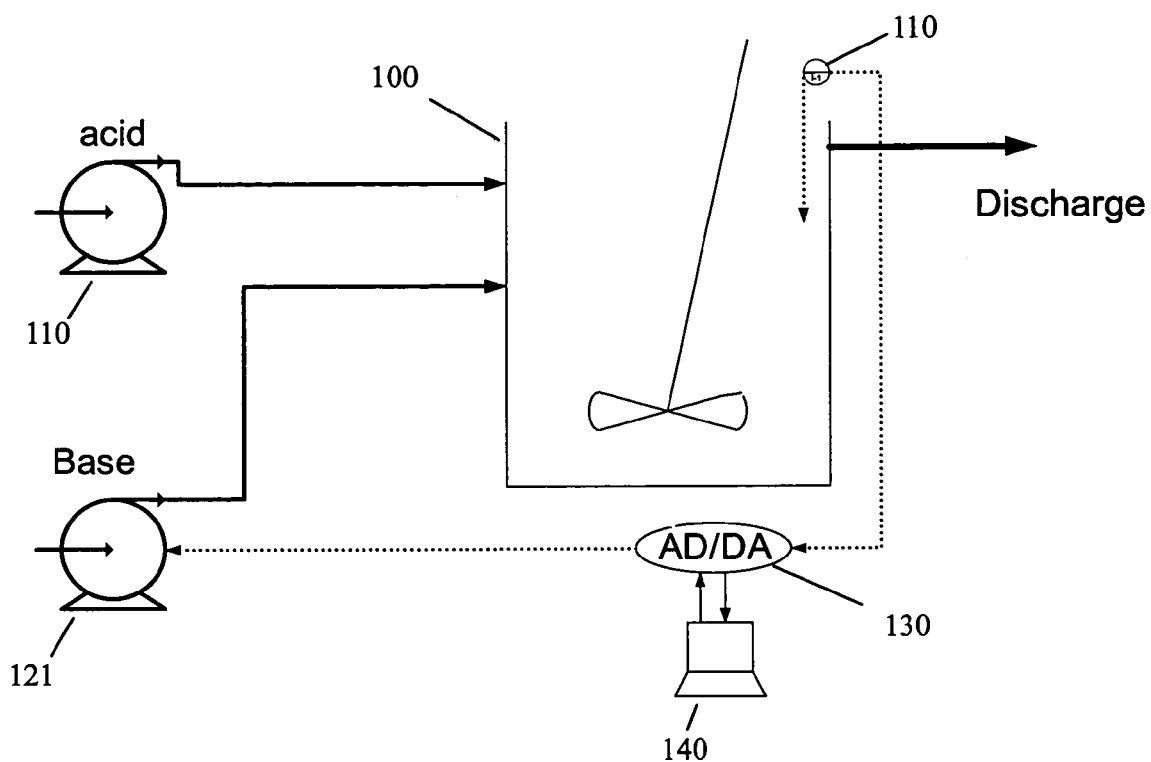
FIG. 22 shows a schematic diagram of an acid-base neutralization pilot plant.

5. Experiments on Process Pilot Plant of Acid-base Neutralization Control System Experiment equipment used in the experiment is shown in FIG. 22. In this experiment, we used a continuously stirring tank reactor (CSTR) having two inlets as a reactor 100, wherein one was used for introducing an acidic solution (acetic acid and proprionic acid), and the other was used for feeding a basic solution (sodium hydroxide). The discharge was carried out by overflow, which could maintain a constant water level in the reactor 100 (i.e. a constant reaction volume). The acidic solution was fed at a constant flow rate through a metering pump 120, and the basic solution was fed through a metering pump 121 to the reactor 100. Only the inlet flow of the basic solution was controlled, and the flow rate was controlled depending on the pH value of the reactor 100. A pH sensor (not shown in the figure) was mounted in the reactor 100. The signals detected by the sensor were converted to currents (4~20 mA) by a transmitter 110, which were converted by an AD/DA converter 130 to digital signals, which were then transmitted to a computer 140. Various control experiments (PID, IMC, . . . , etc.) were carried out according to different computer programs. A control action outputted from the computer 140 was transmitted to the AD/DA converter 130 for digital-to-analog conversion, and then to a control pump 121 for controlling the flow rate of the basic solution at a desired value. Detailed information of the experimental experiment is shown in the following:

1. pH sensor:
    Model: HI1090T, from HANNA Instruments Co.
2. pH transmitter:
    Model: HI8711E, from HANNA Instruments Co.
3. Mixer:
    Model: HI190M/U, from HANNA Instruments Co.
4. pH standard solution:
    Models: HI7004, HI7007, and HI7010, from HANNA Instruments Co., having pH values of 4, 7, and 10, respectively, which are mainly for the pH calibration for the pH detecting equipment.
5. Metering Pump:
    Purchased from Lang Apparatebau GmBH—version 30E/32E
6. Software for graphical control:
    ICONICS—GENESIS32

In these experiments, we used a mixture solution of two mono-protic acids (glacial acetic acid and propionic acid) as the inlet acidic solution. The experiments were carried out the same as the computer program simulations, where the acidic solution was fed at a constant flow rate, and the inlet flow rate of the basic solution was varied to control the pH value in the CSTR. The basic solution was an aqueous solution of NaOH. The pH setring, and the initial conditions of concentrations and flow rates are listed in Table 2:

TABLE 2

| Initial values and parameter settings | |
|---|---|
| pH value | 6.5 |
| $C_{0,AcH}$ | 1.0 mol/L |
| $C_{0,PrH}$ | 1.0 mol/L |
| $C_{0,NaOH}$ | 2.0 mol/L |
| $Q_A$ | 14.2 mL/min |
| $Q_B$ | 14.0 mL/min |
| Q | 28.2 mL/min |
| V | 1.0 L |

Figure 23:
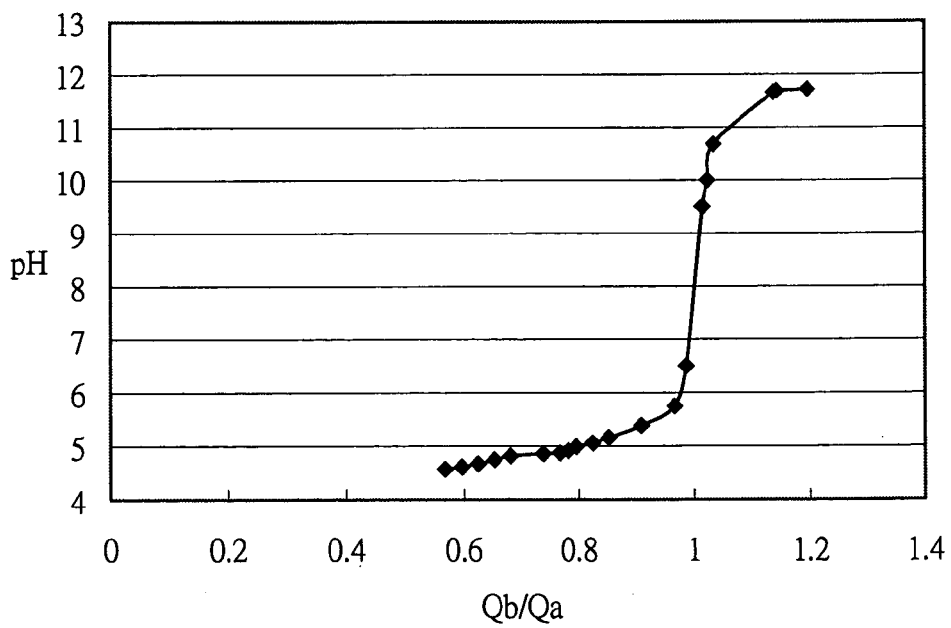
FIG. 23 shows a pH curve of an acid-base neutralization experiment using the equipment of FIG. 22, wherein Qb/Qa is the ratio of the basic solution flow rate to the acidic solution flow rate.

In order to understand the relationship between the pH variation and the acidic/basic solution flow rates, we used various flow rate ratios of the basic solution and the acidic solution (Qb/Qa). The results are shown in the titration curve in FIG. 23. The titration curve indicates that the experimental results are very close to those of the simulation, where the pH value of the system's equivalent point is near about 8.5.

Figure 24A:
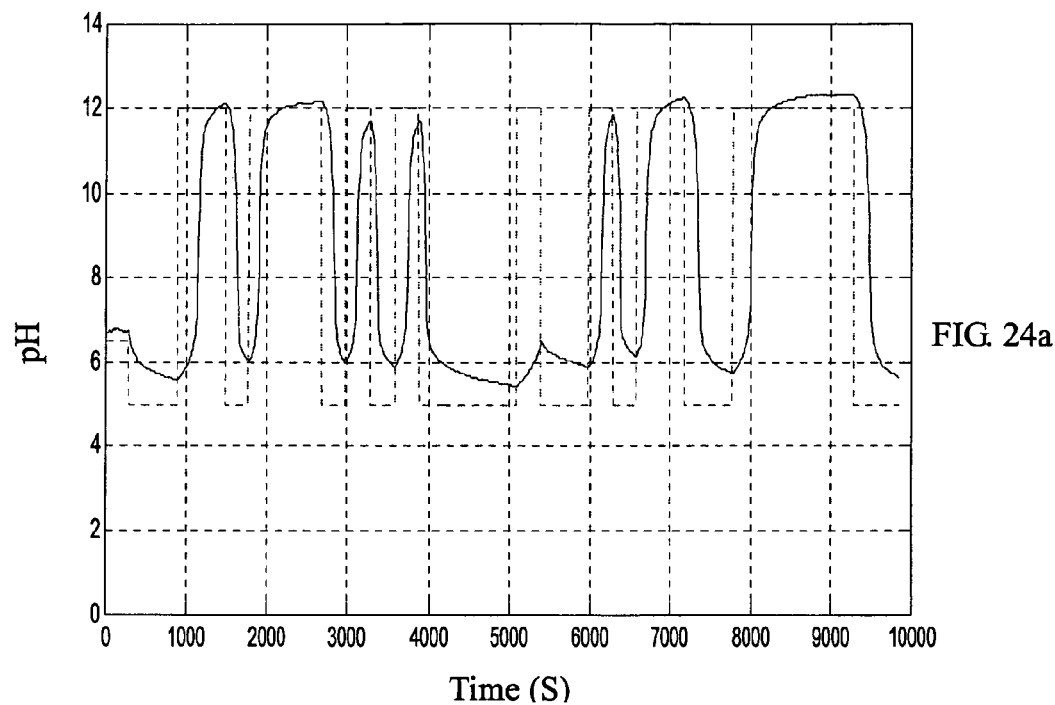
FIG. 24a shows the relationship of the pH value output (solid line) and set-point (dot line) versus time for said acid-base neutralization experiment.
Figure 24B:
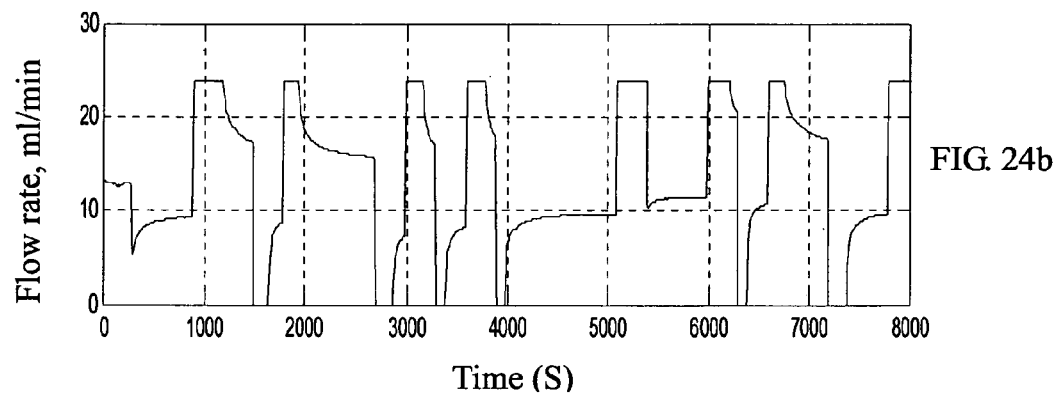
FIG. 24b shows the relationship of the control action (basic solution flow rate) versus time.
Figure 25:
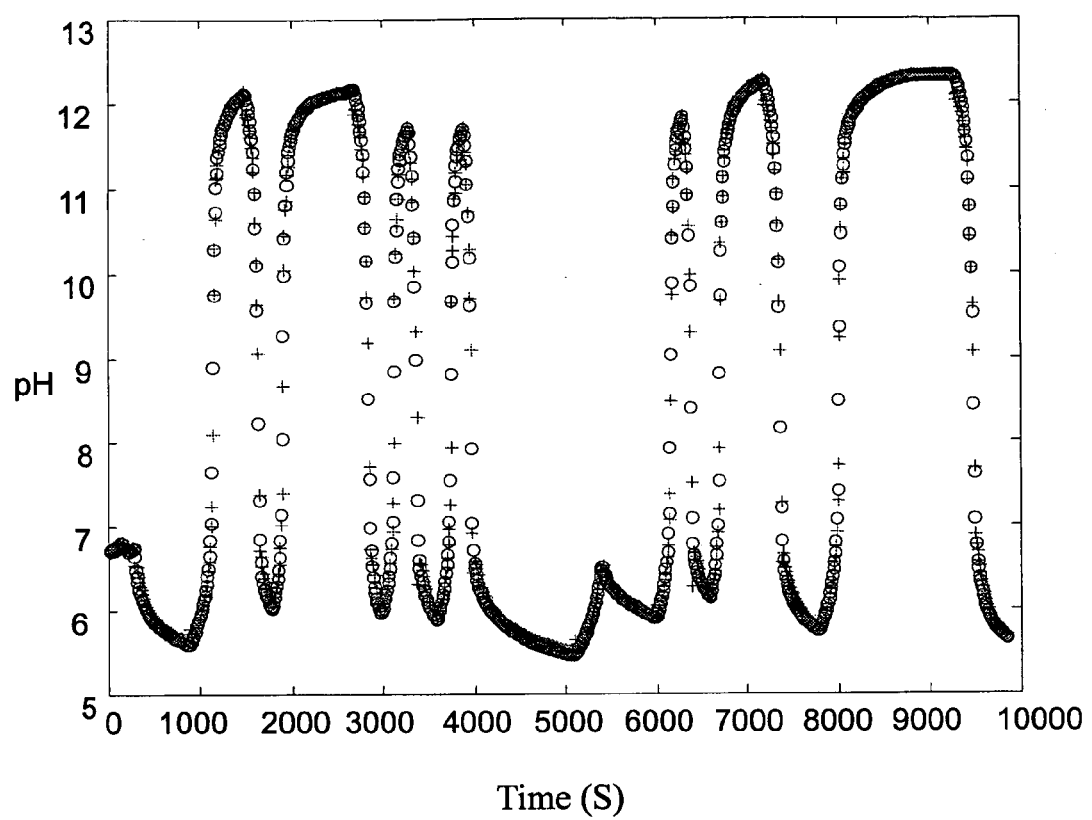
FIG. 25 shows the training results of a neural network model on an acid-base neutralization experiment using the equipment of FIG. 22, wherein "o" represents an actual value, and "+" represents a predicted value.
Figure 26:
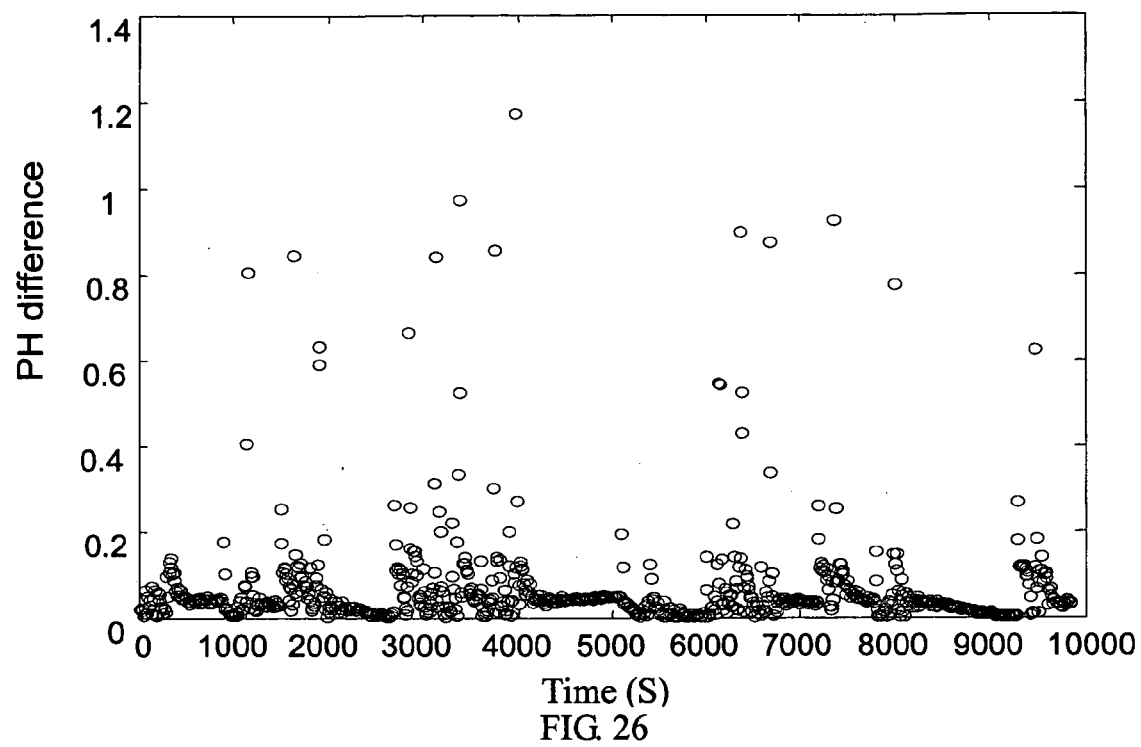
FIG. 26 shows the training results of a neural network model on an acid-base neutralization experiment using the equipment of FIG. 22, wherein absolute errors between the predicted pH values and the actual pH values from the system are shown.
Figure 27:
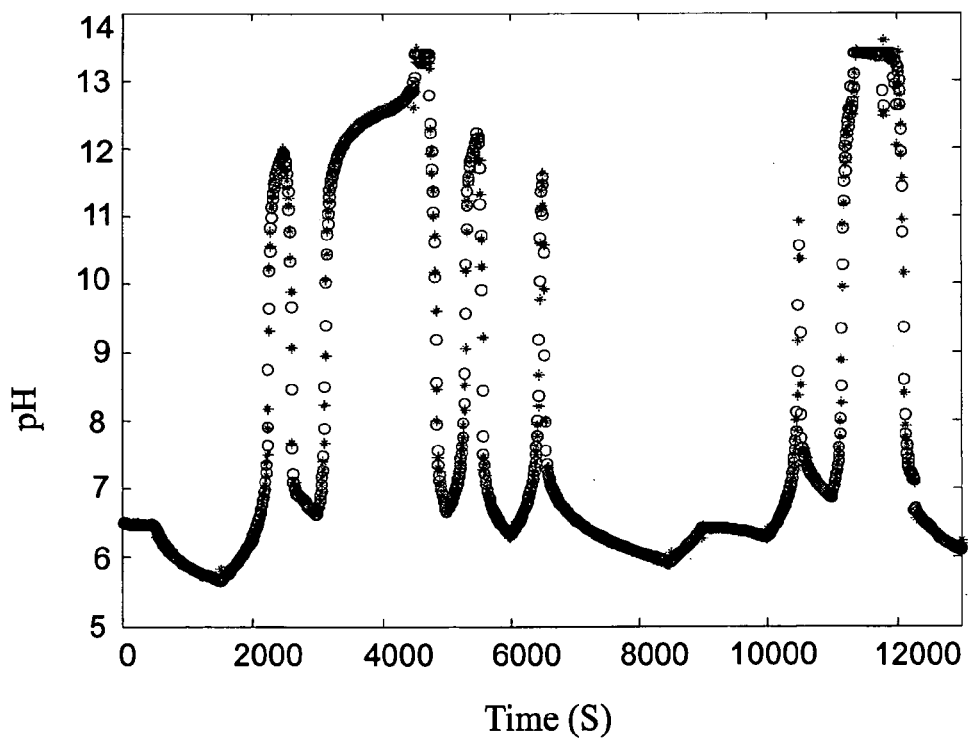
FIG. 27 shows the test results of using a neural network model to perform a pH value control on the equipment of FIG. 22, wherein "*" represents a predicted pH value, and "o" represents an actual pH value.
Figure 28:
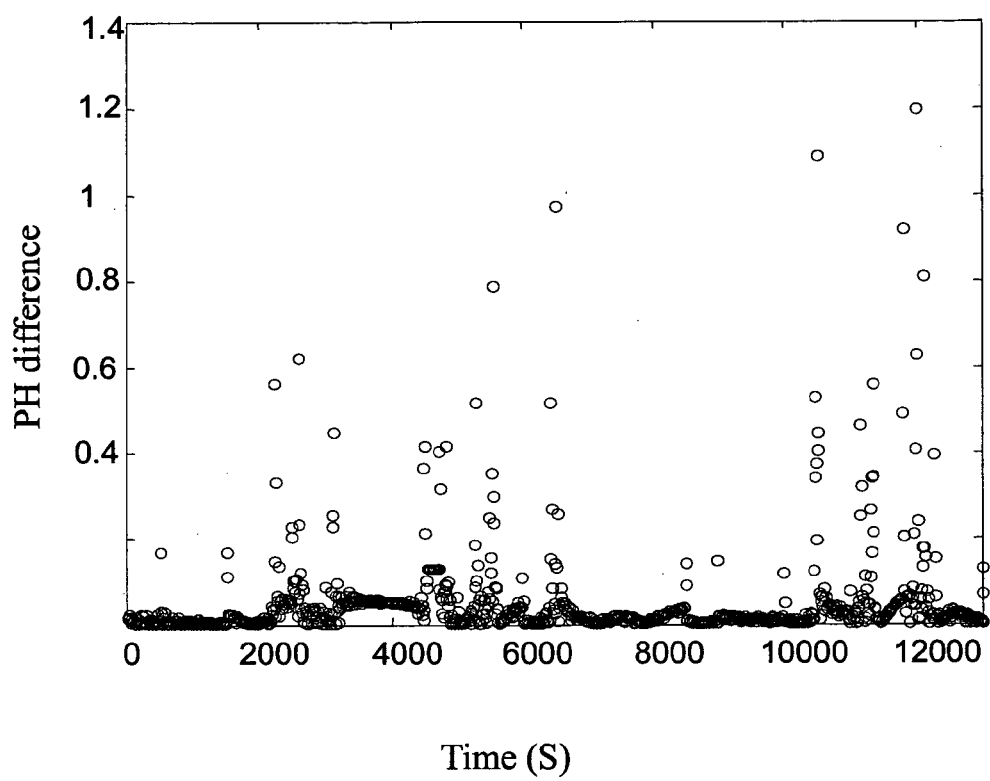
FIG. 28 shows the test results of using a neural network model to perform a pH value control on the equipment of FIG. 22, wherein absolute errors between the predicted pH values and the actual pH values from the system are shown.

Collection of the Training Data:

The method used for generation of the training experimental data was same as that used in the computer program simulation. A PI controller and a string of set-point change sequences generated by PRBS algorithm were used to operate the system. The pH of the system varied in a pH range of 5 to 12. The sampling interval was set to 10 seconds. We collected 987 sets of training data. The experimental results are shown in FIG. 24. Another 1300 sets of testing data were prepared.

Set-up of Neural Network Model and Controller Setting:

The architecture of the neural network model used was identical to that used in the computer program simulation, except that the number of the nodes used in the hidden layer was altered for the following reasons. There were insufficient training data points near the equivalent point, the limit of which cannot be broken through in spite of increasing the capability of the model in learning a non-linear system. For the convenience of learning and reducing the complexity of the model, the number of nodes was reduced from the original eight nodes to four. However, the input and output remained unchanged. The training and test results are separately shown in FIG. 25, FIG. 26, FIG. 27, and FIG. 28.

Meanwhile, the stably assistant controller in the robust model predictive control architecture was changed from the original neural adaptive control (NAC) to the common PI controller in order to test whether said architecture had the same robust performance with a different assistant controller. In this experiment, the PI controller was based on the IMC algorithm and the one-quarter decay ratio. We had separately formulated two sets of parameters (1) $K_c=150$ and $\tau_I=1500$, (2) $K_c=5$ and $\tau_I=150$, and the results were discussed further in the following.

Figure 29A:
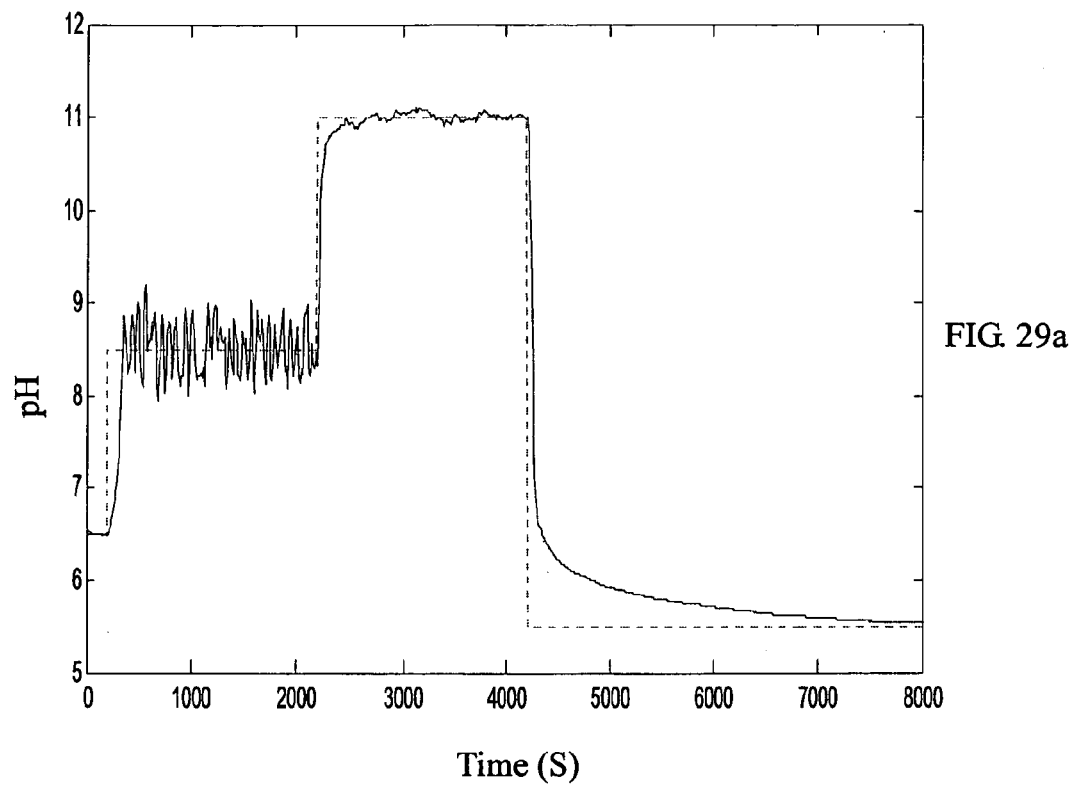
FIG. 29a shows the relationship of the pH value output (solid line) and set-point (dot line) versus time.
Figure 29B:
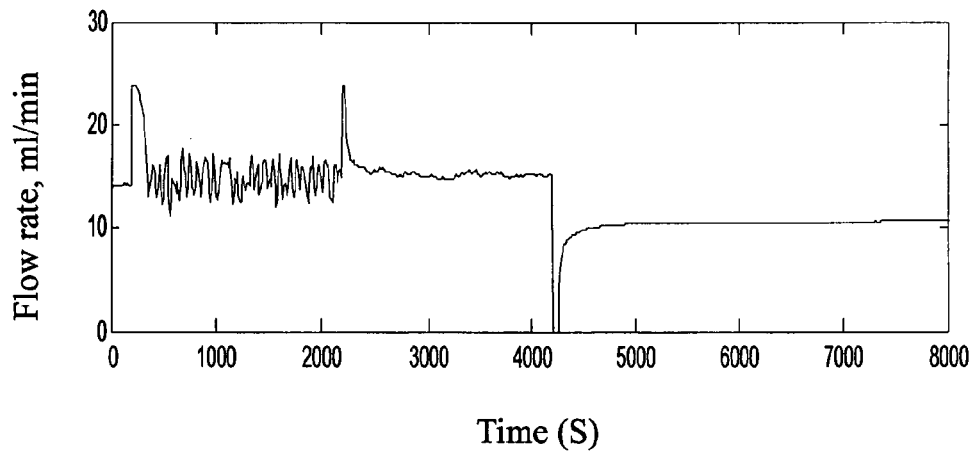
FIG. 29b shows the relationship of the control action (basic solution flow rate) versus time.
Figure 30A:
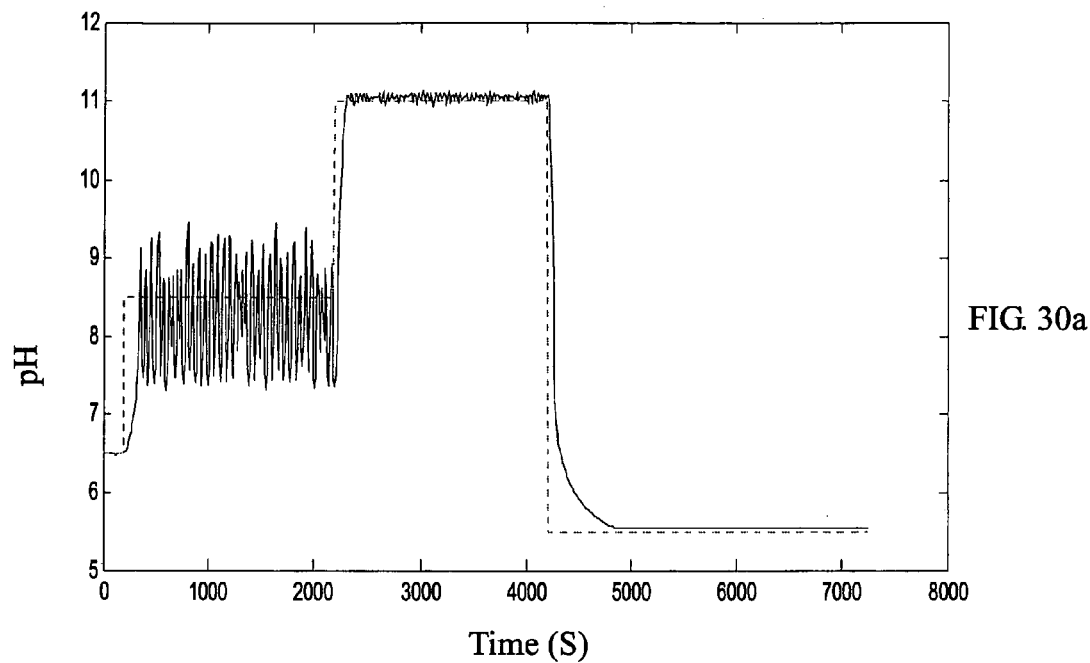
FIG. 30a shows the relationship of the pH value output (solid line) and set-point (dot line) versus time.
Figure 30B:
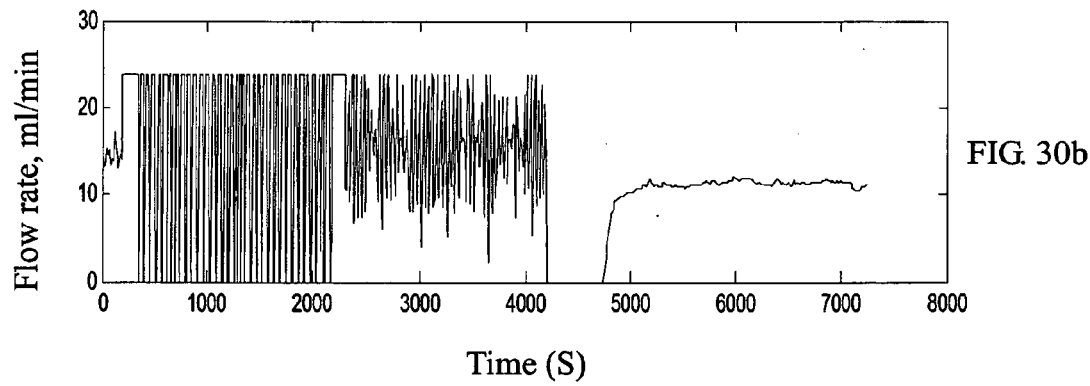
FIG. 30b shows the relationship of the control action (basic solution flow rate) versus time.

Comparison and Discussion of Control Results:

First, we carried out a control test on the system by a series of set-point changes. The acid-base neutralization reaction had dramatically different non-linear properties depending on the difference between the system's current pH value and the equivalent point, wherein the system's responses were rather smooth and low in non-linearity at high pH values and low pH values (i.e. at two ends away from the equivalent point). The non-linearity of the system's response grew more conspicuous as the pH value was set closer to the equivalent point. Thus, It can be seen from FIG. 29 that the PI controller using the settings of (1) has a better control performance when the set-point is near the equivalent point. Correspondingly, however, if the set-point is far away from the equivalent point, where the non-linearity of the system's response is no longer high, the moderate control strategy adopted by the settings of (1) requires more time to achieve the control objectives. By comparison, it can be seen in FIG. 30 that the PI controller using the settings of (2) has a faster control response. However, the drawback of an excessively large control amplitude is seen, when the set-point approaches the equivalent point.

Figure 31A:
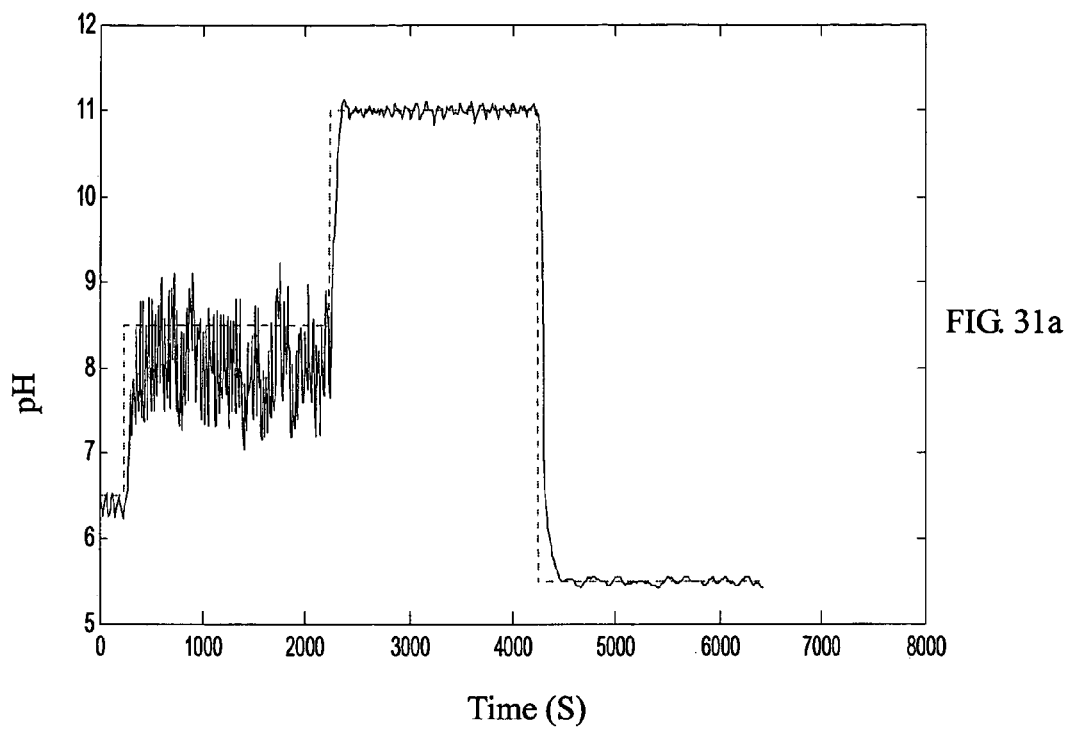
FIG. 31a shows the relationship of the pH value output (solid line) and set-point (dot line) versus time.
Figure 31B:
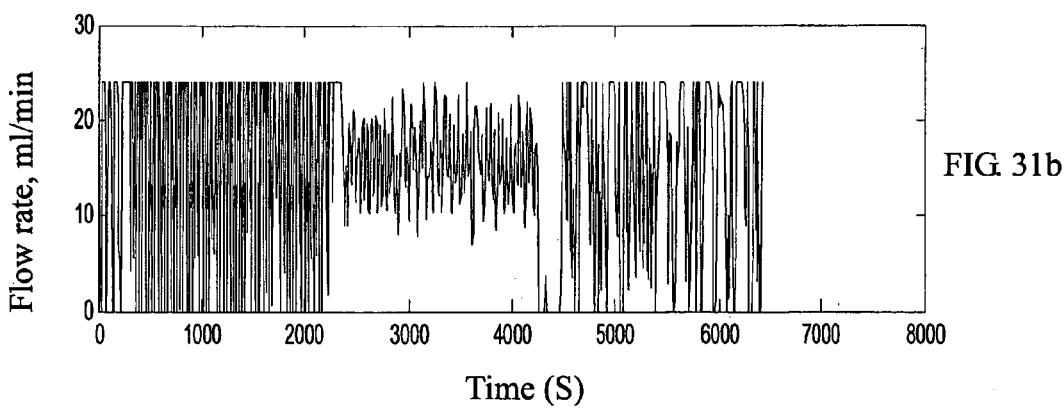
FIG. 31b shows the relationship of the control action (basic solution flow rate) versus time.

In FIG. 31, the performance of the conventional model predictive control is barely satisfactory. The system is brought under control only when the pH value is very far away from the equivalent point. If a system model forward prediction is used as ssistance, the controller's response is very rapid in response to a set-point change. However, the control actions become very vigorous and constantly oscillated between the upper and lower control boundaries. Obviously, the controller at this time urgently requires the assistance of a stable apparatus and mechanism. Therefore, we adopted a PI controller with the settings of (1) as a stably assistant controller to form a robust model predictive control architecture. As shown in FIG. 32, the overall control performance is rapid and smooth—with the rapid performance of a model predictive controller and the smooth property of a PI controller with the settings of (1).

Figure 33:
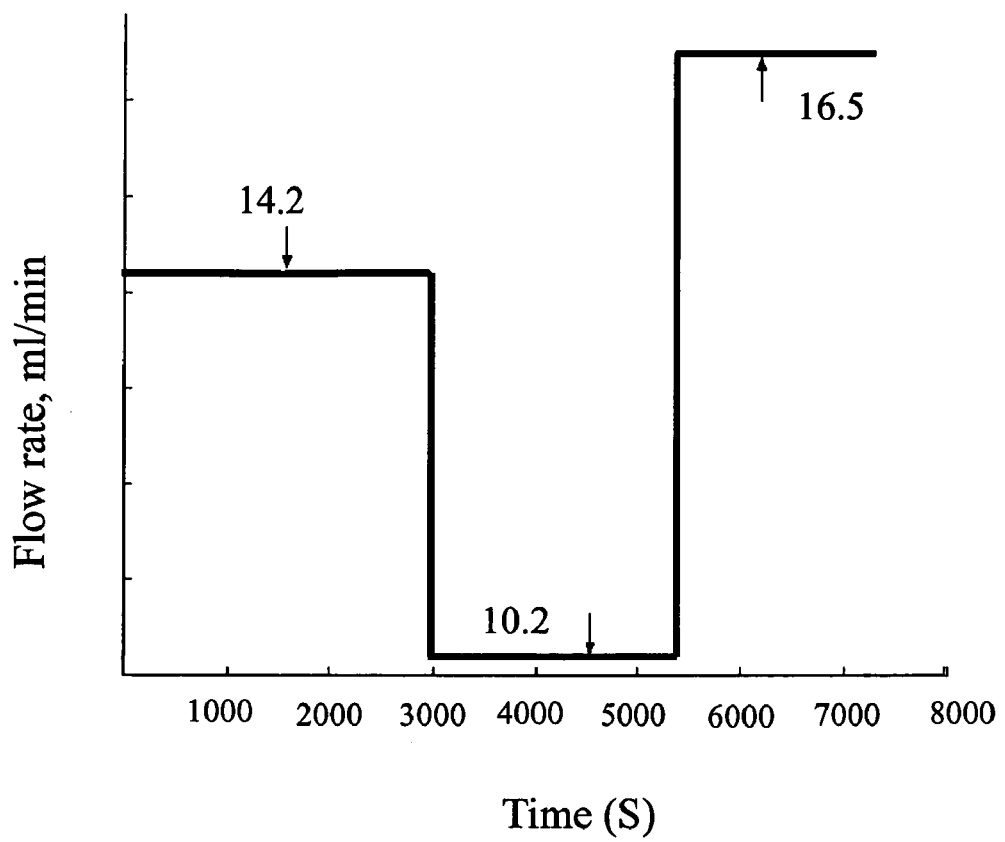
FIG. 33 shows the variation of the inlet acidic solution flow rate.
Figure 34A:
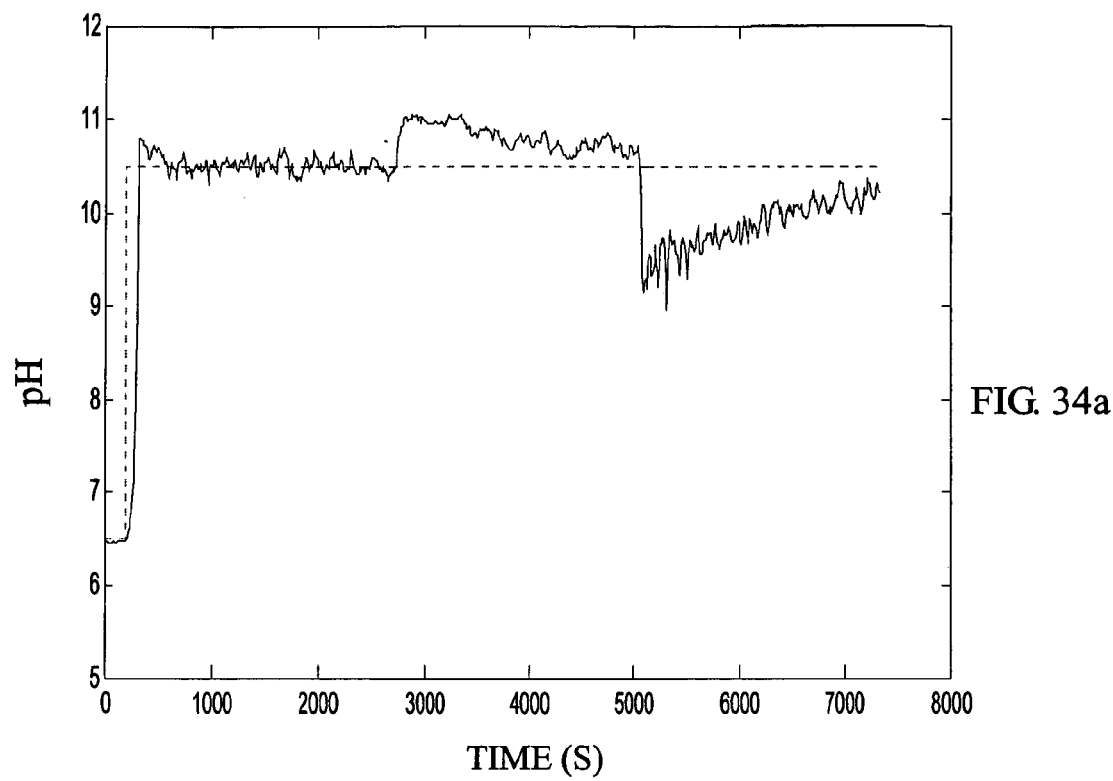
FIG. 34a shows the relationship of the pH value output (solid line) and set-point (dot line) versus time.
Figure 34B:
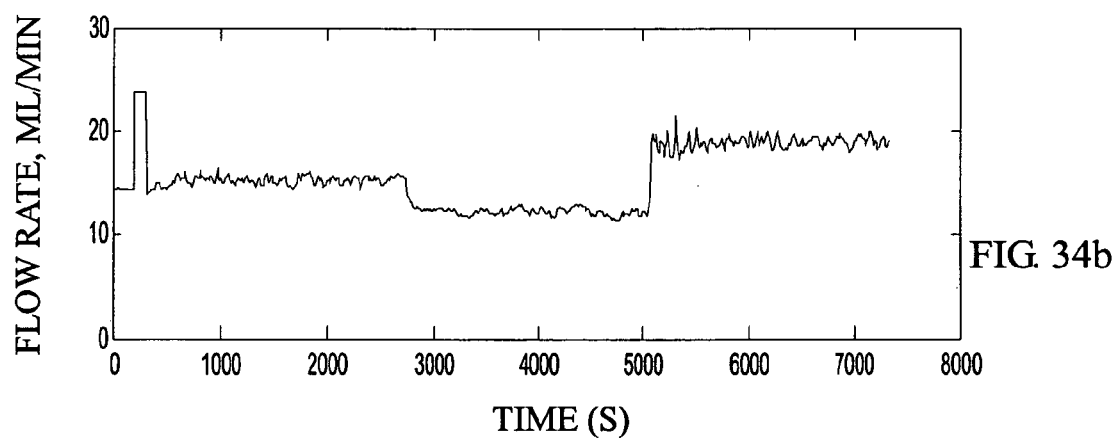
FIG. 34b shows the relationship of the control action (basic solution flow rate) versus time.
Figures 35A, 35B:
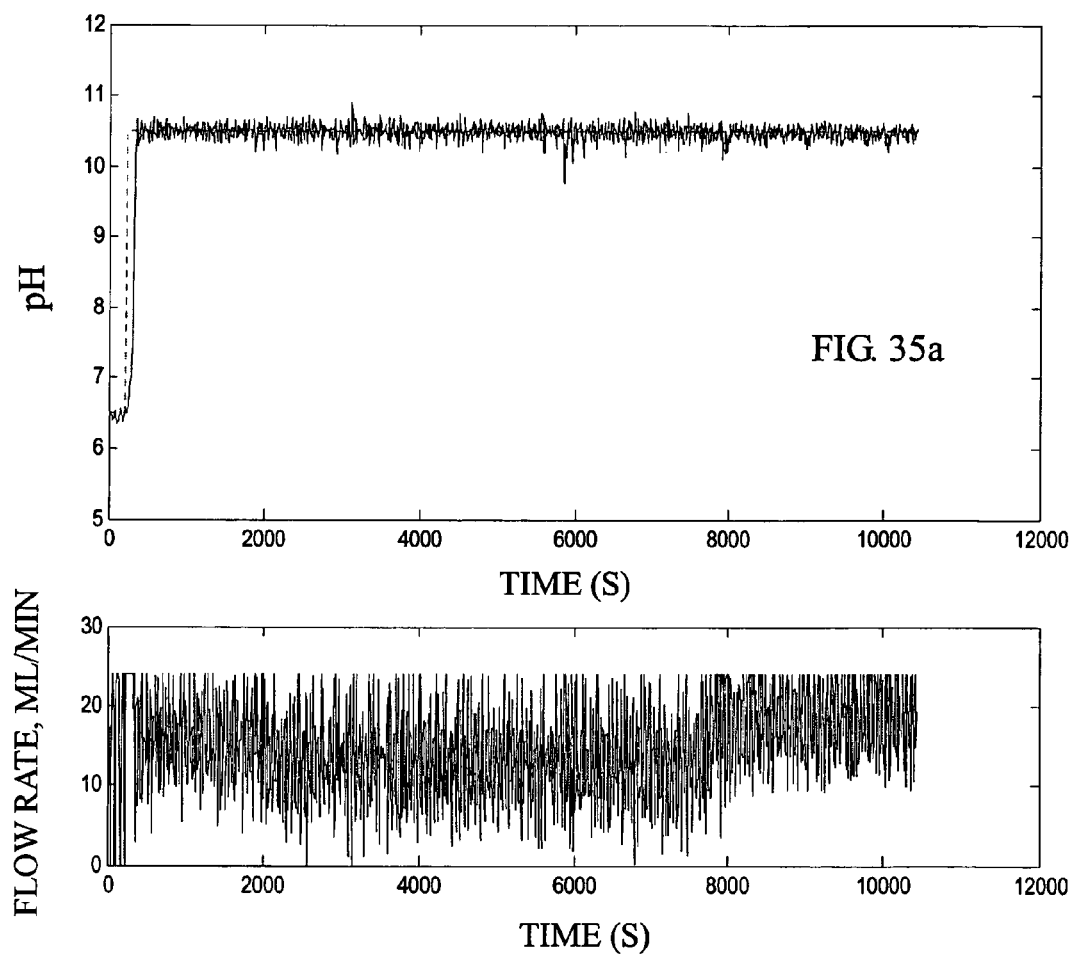
FIG. 35a shows the relationship of the pH value output (solid line) and set-point (dot line) versus time.
FIG. 35b shows the relationship of the control action (basic solution flow rate) versus time.
Figures 36A, 36B, 36C, 36D:
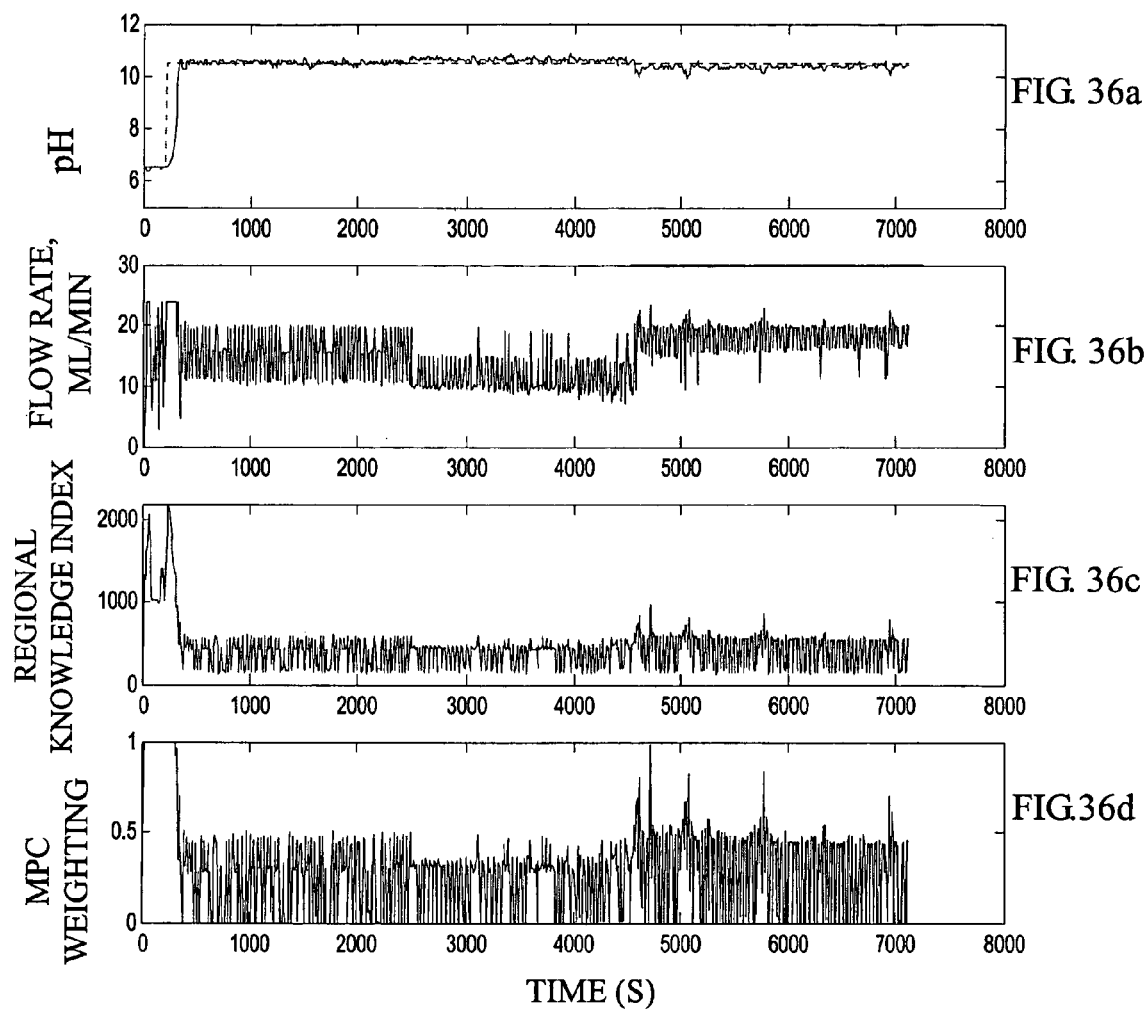
FIG. 36a shows the relationship of the pH value output (solid line) and set-point (dot line) versus time.
FIG. 36b shows the relationship of the control action (basic solution flow rate) versus time.
FIG. 36c shows the relationship of the area knowledge index versus time.
FIG. 36d shows the MPC weighting versus time.

Generally speaking, in an actual process control, the importance of eliminating disturbances exceeds the control for the change of the set-point. Therefore, we used the same controller to conduct a control experiment in eliminating disturbances. We altered the flow rate of the acidic solution to generate an unpredictable disturbance in the system, and the performance of each controller under disturbances was studied. Changes of the flowsrate of the acidic solution are shown in FIG. 33. After altering the flow rate of the acidic solution as an unpredictable disturbance, the system's pH value changed. For the PI controller, even though the system was able to be brought back to the set point after the disturbance, it took a long time to complete the control using only the feedback of error without the aid of a system model prediction, in particular when a small gain ($K_c$) was used, as shown in FIG. 34. Such a result is consistent with that of the previous computer program simulation. In FIG. 35, the conventional model predictive control had a fine performance due to the set-point was far away from the equivalent point. The system oscillated within the range of about 0.3 pH value from the set-point. Noticeably, the actions caused by the controller were still rather rapid and vigorous. The robust model predictive controller of the present invention reacted in a relatively much smoother way as shown in FIG. 36.

What is claimed is:

1. A process controlling method with merged two-control loops comprising the following steps:
   i) inputting a value of $y_k$ of a controlled variable of a process at a sampling time point of k to a coordinator, so that the coordinator outputs a weighting, $\psi$, wherein $0 \leq \psi \leq 1$, and k is 0 or a positive integer;
   ii) inputting said $y_k$ to a model predictive controller (MPC), so that a MPC output of a manipulated variable, $u_{MPC}$, is obtained from said MPC;
   iii) inputting said $y_k$ to a stably assistant controller (SAC), so that a SAC output of said manipulated variable, $u_{SAC}$, is obtained from said SAC;
   iv) calculating a combination output of said manipulated variable, u, according to the following formula:

$$u = \psi \cdot u_{MPC} + (1-\psi) * u_{SAC}$$

wherein $\psi$, $u_{MPC}$, and $U_{SAC}$ are defined as above; and
   v) adjusting said process by using said combination output; wherein
   in step i), $\psi$ is determined according to a calculation of a regional knowledge index function, said regional knowledge index function is established by evaluating performance of the MPC alone in controlling the process with test data so that said regional knowledge index function reflects whether the value of $y_k$ falls in a well trained region, an unfamiliar region or an intermediate region between these two regions, wherein $\psi=1$, when the value of $y_k$ falls in the well trained region; $\psi=0$, when the value of $y_k$ falls in the unfamiliar region; and $0<\psi<1$, when the value of $y_k$ falls in the intermediate region, wherein $\psi$ approaches 0, when the value of $y_k$ is getting closer to the unfamiliar region, and $\psi$ approaches 1, when the value of $y_k$ is getting closer to the well trained region;
   in step v), said adjusting will cause a difference between a value of $y_{k+1}$ of the controlled variable at a sampling time point of k+1 and a set-point value, $y_d$, within a predetermined range, when $\psi=1$; and said adjusting will cause an absolute difference between a value of $y_{k+1}$ of the controlled variable at a sampling time point of k+1 and a set-point value, $y_d$, smaller an absolute difference between the $y_k$ and $y_d$, when $\psi=0$.

2. The method according to claim 1, wherein said SAC is a PI controller, PID controller or neural adaptive controller.

3. The method according to claim 1, wherein said MPC is an artificial neural network model controller.

* * * * *